(12) United States Patent
Muto

(10) Patent No.: US 12,277,909 B2
(45) Date of Patent: Apr. 15, 2025

(54) DISPLAY DEVICE, PHOTOELECTRIC CONVERSION DEVICE, ELECTRONIC DEVICE, MOVING BODY, AND WEARABLE DEVICE

(71) Applicant: CANON KABUSHIKI KAISHA, Tokyo (JP)

(72) Inventor: Takashi Muto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/482,477

(22) Filed: Sep. 23, 2021

(65) Prior Publication Data

US 2022/0108658 A1 Apr. 7, 2022

(30) Foreign Application Priority Data

Oct. 1, 2020 (JP) .................................. 2020-167219

(51) Int. Cl.
*G09G 3/3266* (2016.01)
*G09G 3/3225* (2016.01)
(Continued)

(52) U.S. Cl.
CPC ......... *G09G 3/3266* (2013.01); *G09G 3/3225* (2013.01); *G02B 27/0172* (2013.01);
(Continued)

(58) Field of Classification Search
CPC ............... G09G 3/3225; G09G 3/3266; G09G 2310/02; G09G 2310/0202;
(Continued)

(56) References Cited

U.S. PATENT DOCUMENTS 5,049,865 A * 9/1991 Nakamura ................ G09G 3/20
345/204
7,161,576 B2 1/2007 Kawabe
(Continued)

FOREIGN PATENT DOCUMENTS

JP H06-326950 A 11/1994
JP H07-146668 A 6/1995
(Continued)

OTHER PUBLICATIONS

English Language Machine Translation of JP2003179804A (Year: 2003).*

(Continued)

*Primary Examiner* — Jason M Mandeville
(74) *Attorney, Agent, or Firm* — Venable LLP

(57) ABSTRACT

A display device comprising a scanning circuit configured to scan a pixel array in which a plurality of pixels are arranged in a matrix and a control circuit configured to control the scanning circuit to scan the pixel array in accordance with a display mode selected among a plurality of display modes is provided. The plurality of display modes include a first display mode for repeatedly performing an operation unit formed by a plurality of scanning sequences including a first scanning sequence by which the scanning circuit scans, in a predetermined order, a predetermined scanning line of the pixel array. When shifting to the first display mode from a display mode which is other than the first display mode among the plurality of display modes, the control circuit controls the scanning circuit to start the operation unit from the first scanning sequence.

24 Claims, 20 Drawing Sheets

(51) Int. Cl.
*G02B 27/01* (2006.01)
*H04N 23/63* (2023.01)
(52) U.S. Cl.
CPC ........... *G09G 2310/0205* (2013.01); *G09G 2310/0213* (2013.01); *G09G 2340/0435* (2013.01); *G09G 2380/10* (2013.01); *H04N 23/63* (2023.01)
(58) Field of Classification Search
CPC ... G09G 2310/0205; G09G 2310/0213; G09G 2380/10; G09G 2340/0435; G02B 27/0172; H04N 5/23293
USPC ........................................................ 345/204
See application file for complete search history.

(56) References Cited

U.S. PATENT DOCUMENTS

| | | | |
|---|---|---|---|
| 7,515,820 B2 * | 4/2009 | Nakai | H04N 23/673 |
| | | | 396/125 |
| 7,965,270 B2 | 6/2011 | Kawabe | |
| 8,681,142 B2 * | 3/2014 | Bo-Yong | G09G 3/3266 |
| | | | 345/204 |
| 10,438,543 B2 | 10/2019 | Tomizawa | |
| 11,062,641 B2 | 7/2021 | Yamasaki et al. | |
| 11,087,680 B2 | 8/2021 | Tsuboi | |
| 2003/0058229 A1 | 3/2003 | Kawabe | |
| 2006/0044251 A1 | 3/2006 | Kato | |
| 2007/0085794 A1 | 4/2007 | Kawabe | |
| 2010/0295844 A1 | 11/2010 | Hayashi | |
| 2011/0187691 A1 * | 8/2011 | Chung | G09G 5/00 |
| | | | 345/204 |
| 2018/0166023 A1 | 6/2018 | Tomizawa | |
| 2020/0105180 A1 * | 4/2020 | Wang | G09G 3/3677 |
| 2020/0143736 A1 | 5/2020 | Muto et al. | |
| 2020/0143741 A1 | 5/2020 | Tsuboi | |
| 2020/0143744 A1 * | 5/2020 | Kim | G09G 3/3233 |

FOREIGN PATENT DOCUMENTS

| | | | |
|---|---|---|---|
| JP | 2003-036056 A | | 2/2003 |
| JP | 2003179804 A | * | 6/2003 |
| JP | 2006-064964 A | | 3/2006 |
| JP | 2010-271365 A | | 12/2010 |
| JP | F2018097074 A | | 6/2018 |
| JP | 2020-076974 A | | 5/2020 |

OTHER PUBLICATIONS

Jun. 14, 2024 Japanese Official Action in Japanese Patent Appln. No. 2020-167219.

* cited by examiner

IMAGE DATA

IMAGE PROCESSING A
IMAGE DISPLAY DATA

IMAGE PROCESSING B1
IMAGE DISPLAY DATA

IMAGE PROCESSING B2
IMAGE DISPLAY DATA

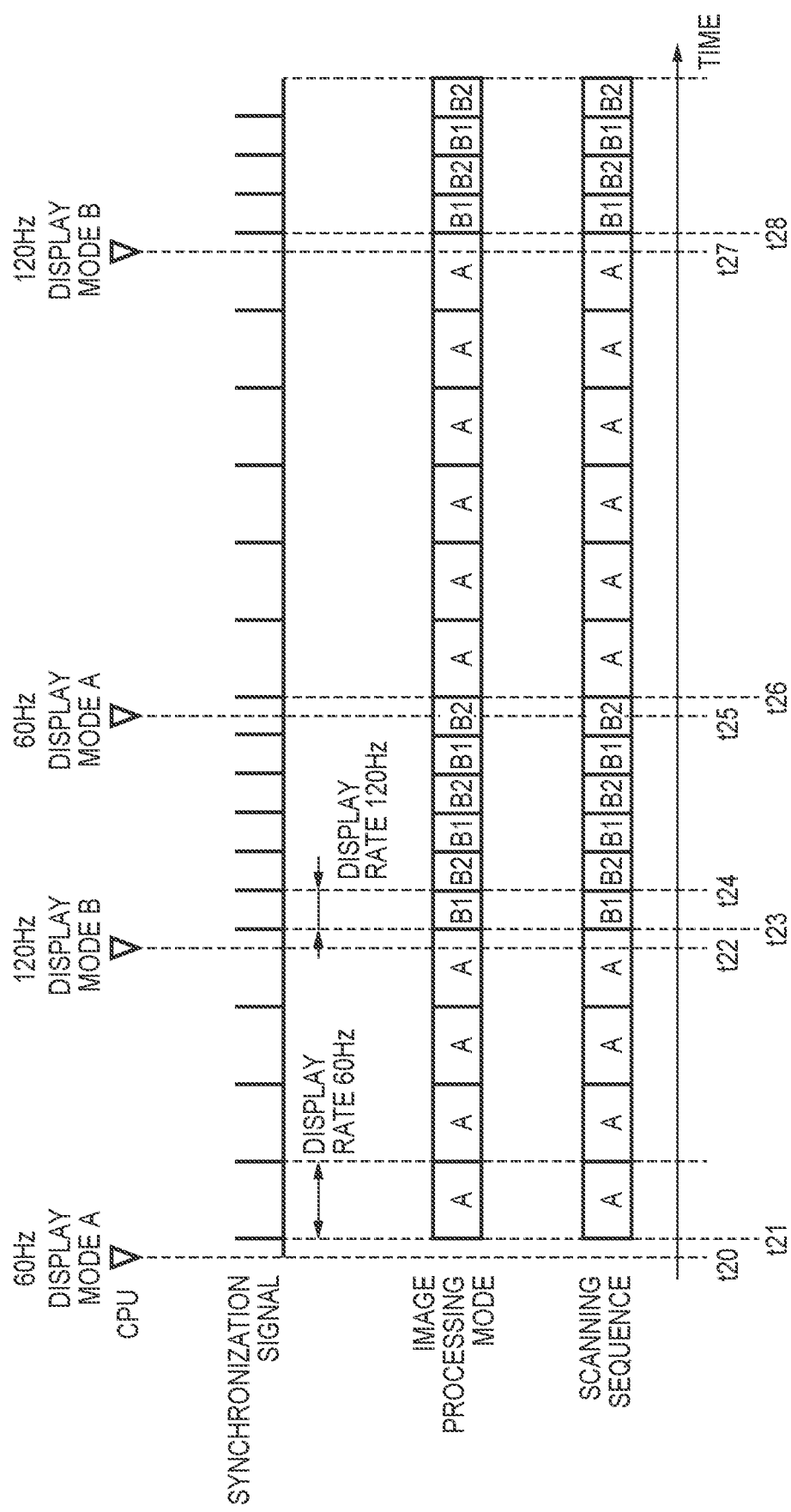

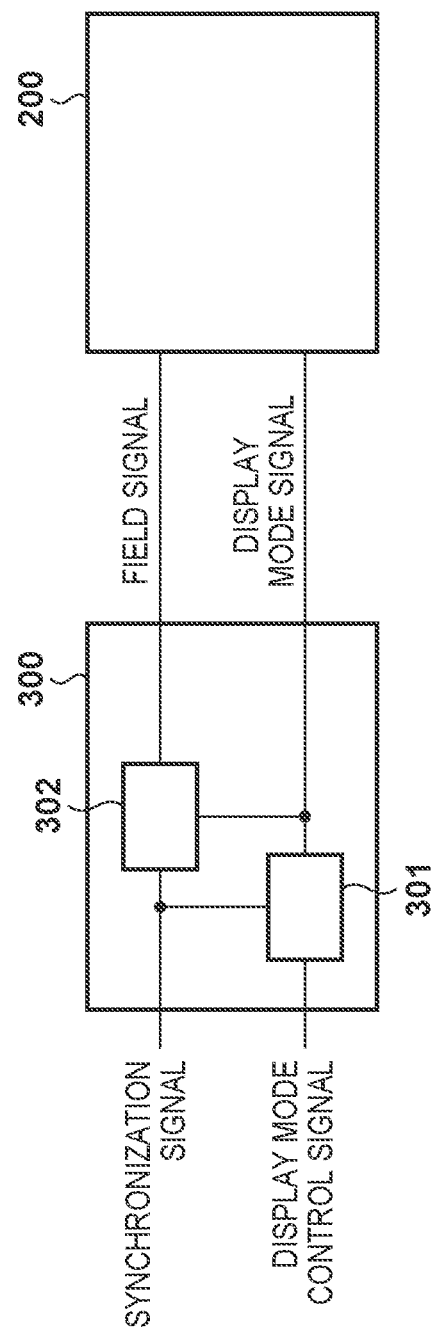

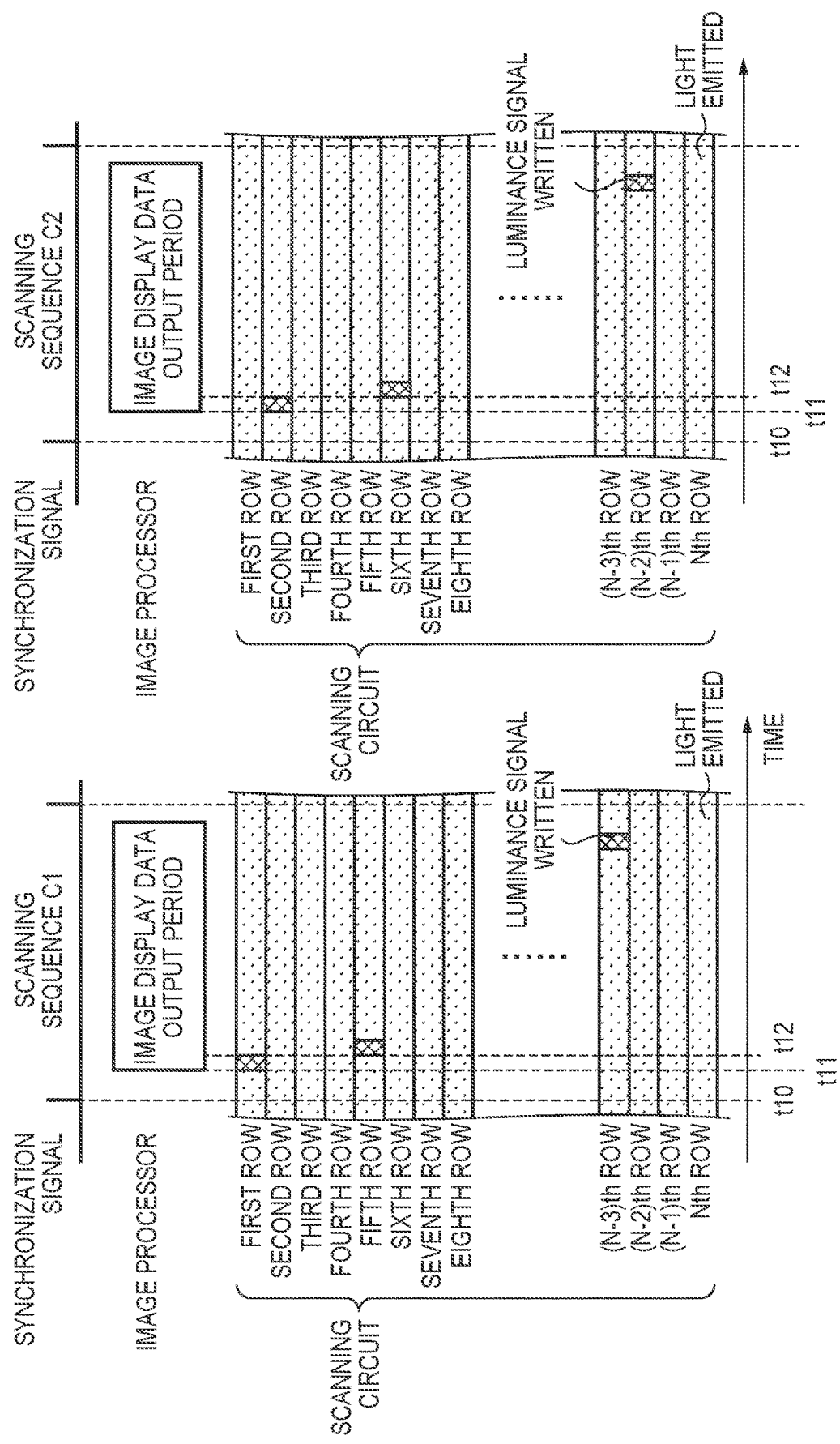

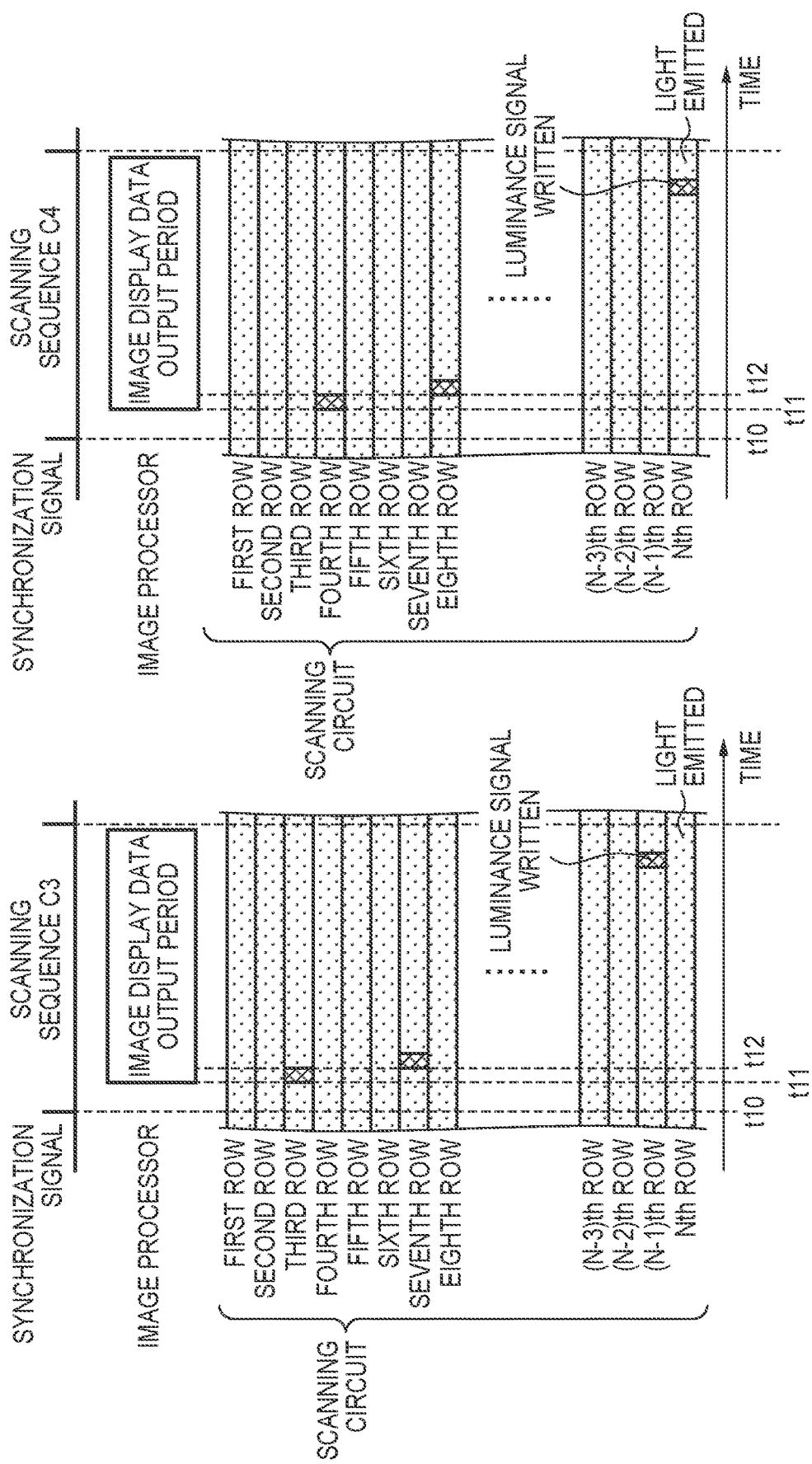

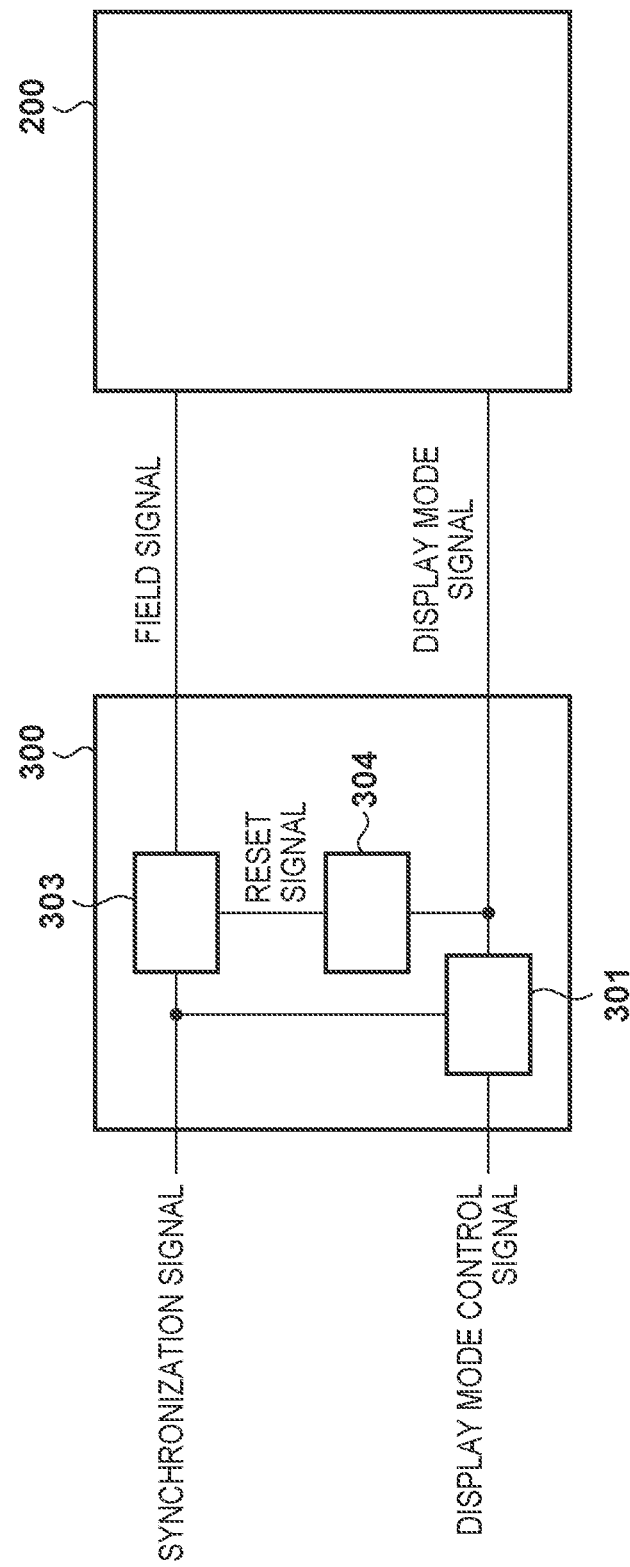

DISPLAY DEVICE, PHOTOELECTRIC CONVERSION DEVICE, ELECTRONIC DEVICE, MOVING BODY, AND WEARABLE DEVICE

BACKGROUND OF THE INVENTION

Field of the Invention

The present invention relates to a display device, a photoelectric conversion device, an electronic device, a moving body, and a wearable device.

Description of the Related Art

In a display device such as a liquid crystal display, an organic EL display, or the like, the frame rate needs to be increased to improve the image quality of an image to be displayed. Japanese Patent Laid-Open No. 2010-271365 discloses that a scanning technique such as an interlaced scanning method is implemented to increase the frame rate by driving a plurality of scanning lines simultaneously in one horizontal line period.

In a case in which an image is to be displayed continuously as in an electronic viewfinder (EVF) of a camera, the power consumption of the display device needs to be suppressed. Since the power consumption may increase when the frame rate is raised in an image display operation, a display mode for displaying an image may be switched by lowering the frame rate in accordance with the image quality of the image to be displayed or the like to suppress the power consumption. When the display mode is to be switched, it is desirable for the display mode to be switched without giving a sense of unnaturalness to a user.

SUMMARY OF THE INVENTION

Some embodiments of the present invention provide a technique advantageous in switching a display mode naturally in a display device.

According to some embodiments, a display device comprising: a scanning circuit configured to scan a pixel array in which a plurality of pixels are arranged in a matrix; and a control circuit configured to control the scanning circuit to scan the pixel array in accordance with a display mode selected among a plurality of display modes, wherein the plurality of display modes include a first display mode for repeatedly performing an operation unit formed by a plurality of scanning sequences including a first scanning sequence by which the scanning circuit scans, in a predetermined order, a predetermined scanning line of the pixel array, and when shifting to the first display mode from a display mode which is other than the first display mode among the plurality of display modes, the control circuit controls the scanning circuit to start the operation unit from the first scanning sequence, is provided.

Further features of the present invention will become apparent from the following description of exemplary embodiments (with reference to the attached drawings).

BRIEF DESCRIPTION OF THE DRAWINGS

FIG. 6 is a timing chart showing an example of an operation of the display device of FIG. 1;

FIG. 7 is a block diagram showing an example of the arrangement of a scanning sequence control circuit of the display device of FIG. 1;

FIGS. 10A to 10D are views each showing an example of the operation of the scanning circuit of the display device of FIG. 1;

FIG. 11 is a block diagram showing an example of the arrangement of the scanning sequence control circuit of the display device of FIG. 1;

DESCRIPTION OF THE EMBODIMENTS

Figure 1:
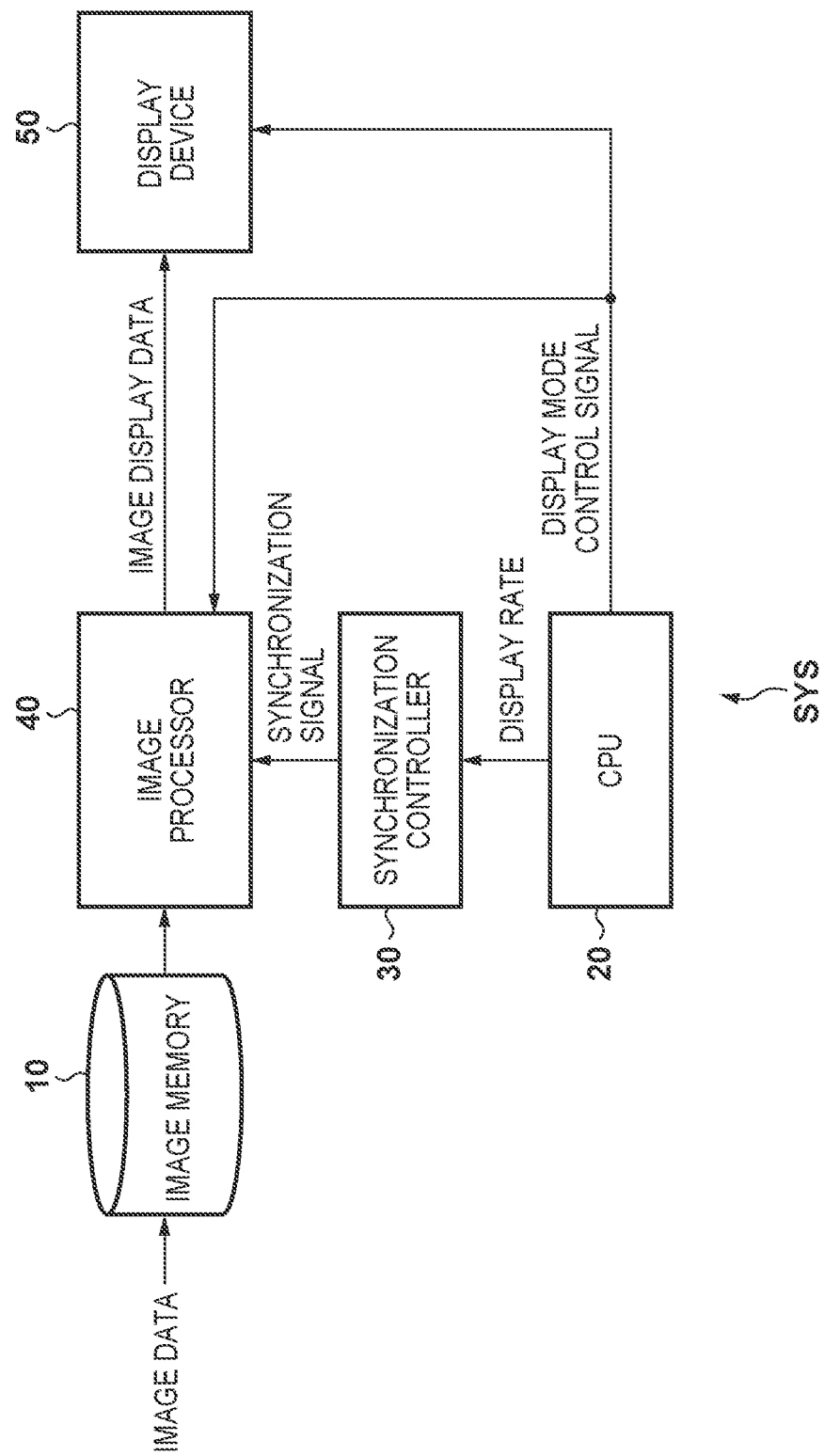
FIG. 1 is a block diagram showing an outline of a display system which includes a display device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A display device according to an embodiment of the present invention will be described with reference to FIGS. 1 to 12. FIG. 1 is a block diagram showing the outline of a display system SYS which includes a display device 50 according to this embodiment. The display system SYS can include an image memory 10, a CPU 20, a synchronization controller 30, an image processor 40, and the display device 50. The display system SYS can be used as a part of, for example, an electronic device that includes the display device 50 for displaying an image. A digital camera, a smartphone, a tablet, or the like can be raised as an example of an electronic device that includes the display system SYS. Image data input to the display system SYS is temporarily accumulated in the image memory 10. The CPU 20 executes programs stored in a memory (not shown) to implement various kinds of processing performed in the display system SYS. As one of the various kinds of processing performed in the display system SYS, a signal for switching a display rate will be output to the synchronization controller 30 by the CPU 20. The signal for switching the display mode will also be output to the image processor 40 and the display device 50 by the CPU 20. The synchronization controller 30 will supply, in accordance with the display rate designated by the CPU 20, a synchronization signal to the image processor 40. The image processor 40 will execute, in accordance with the display rate based on the synchronization signal, predetermined processing on the image data accumulated in the image memory 10, and will supply image display data for displaying an image on a pixel array 100 of the display device 50. Based on the image display data and the instruction from the CPU 20, the display device 50 will display the image at a predetermined display rate and in a predetermined display mode. The display device 50 will display an image by switching between a plurality of display modes.

Figure 2:
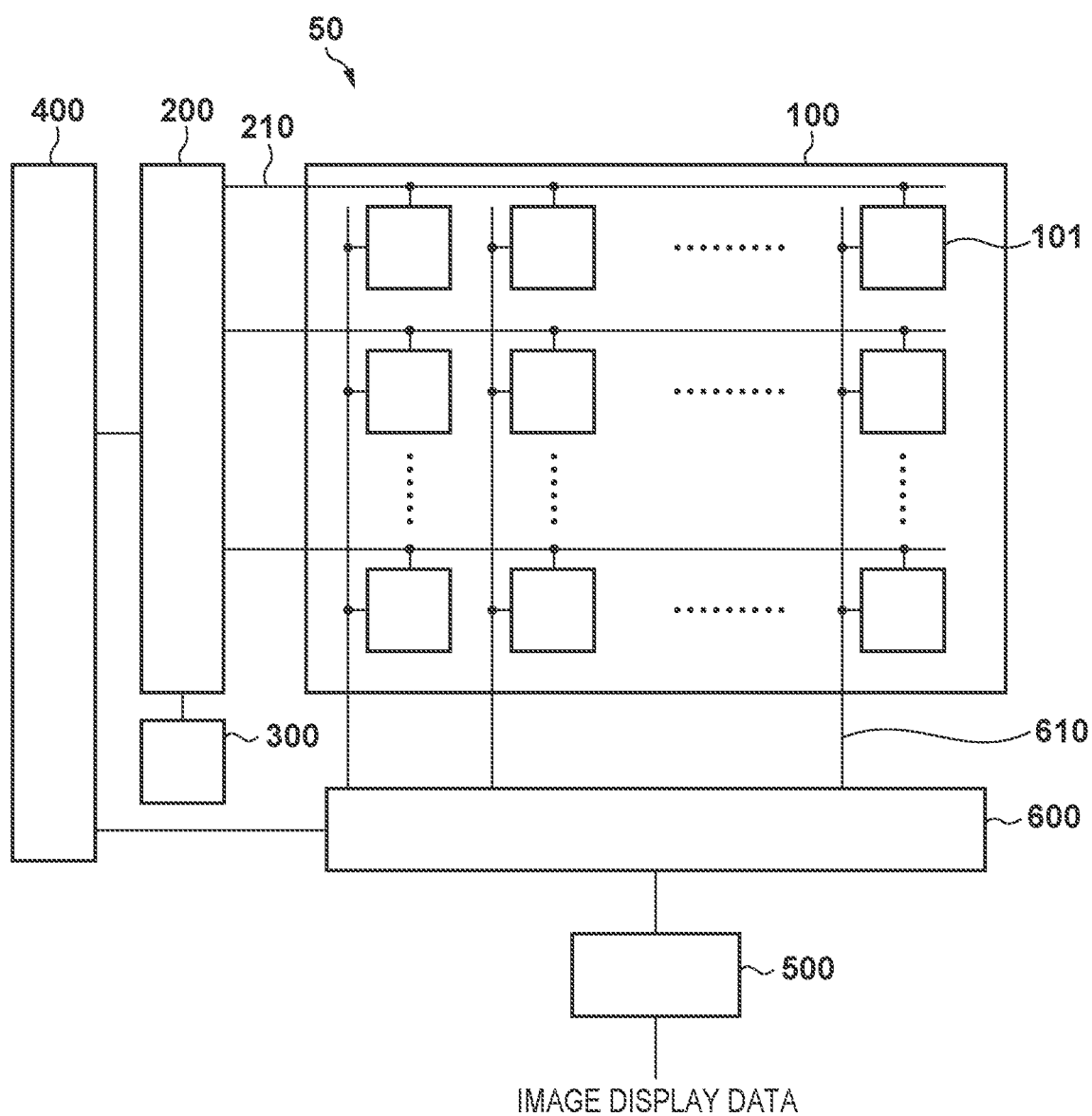
FIG. 2 is a block diagram showing an example of the arrangement of a display unit of the display device of FIG. 1.

FIG. 2 is a block diagram showing an example of the arrangement of the display device 50. The display device 50 includes a scanning circuit 200 for scanning the pixel array 100 in which a plurality of pixels 101 are arranged in a matrix and a control circuit 300 for controlling the scanning circuit 200 so that scanning of the pixel array 100 will be performed in accordance with a display mode selected among a plurality of display modes. The display device 50 also includes a controller 400 for controlling various kinds of processing in the display device 50. The pixel array 100 may be an organic EL display in which each of the pixels 101 arranged in the pixel array 100 includes an organic light emitting element (organic EL element). Alternatively, for example, the pixel array 100 may be a liquid crystal display. Various kinds of displays can be appropriately used as the pixel array 100.

The scanning circuit 200 is controlled by the control circuit 300 and the controller 400, and controls the light emitting operation of the pixels 101 via a scanning line 210 arranged for each row of the pixel array 100. The scanning circuit 200 can also be called a vertical scanning circuit. The controller 400 controls the scanning timing of the scanning circuit 200. A display mode control signal that designates the display mode is input from the CPU 20 to the control circuit 300, and a scanning sequence of the scanning circuit 200 is controlled based on the display mode control signal. Although the controller 400 and the control circuit 300 are shown as separate components in the arrangement shown in FIG. 2, the arrangement is not limited to this. For example, the controller 400 may have the function of the control circuit 300.

The display device 50 further includes a data processing circuit 500 and a signal output circuit 600. The image display data transmitted from the image processor 40 to the display device 50 is input to the signal output circuit 600 via the data processing circuit 500 which performs predetermined data processing. The signal output circuit 600 is controlled by the controller 400 and outputs, to the pixels 101 via a data line 610 arranged for each column of the pixel array 100, a luminance signal obtained by converting the image display data into an analog signal. Each pixel 101 holds a luminance signal in accordance with the control of the scanning circuit 200 and emits light based on the luminance signal.

The display device 50 displays an image by using a plurality of display modes as described above. The plurality of display modes include a display mode A for causing the scanning circuit 200 to scan the predetermined scanning lines 210 of the pixel array 100 in a predetermined order so that, for example, the scanning lines 210 arranged in the pixel array 100 are scanned one by one in sequence to display a single image for each frame at a predetermined frame rate. A progressive scanning method can be raised as a representative example of the display mode A. In addition, the plurality of display modes include a display mode B in which an image of one frame is divided into two fields of an odd-numbered field and an even-numbered field, and the scanning circuit 200 repeatedly performs, at a predetermined field rate, an operation unit formed by a plurality of scanning sequences including a scanning sequence for scanning the odd-numbered field and a scanning sequence for scanning the even-numbered field. An interlaced scanning method can be raised as a representative example of the display mode B. Assume here that a "display rate" according to this specification indicates a frame rate in the case of the display mode A and a field rate in the case of the display mode B.

An operation of the image processor 40 of the display system SYS will be described next. The image processor 40 generates different image display data in accordance with the plurality of display modes. For example, the image processor 40 generates image display data from the image data by operating in a plurality of image processing modes including image processing A corresponding to the display mode A and image processing B1 and image processing B2 corresponding to the display mode B. In a case in which the display mode A is selected as the display mode, the image processor 40 will perform the image processing A. In a case in which the display mode B is selected as the display mode, the image processor 40 will execute the image processing B1 as processing for scanning the odd-numbered field and the image processing B2 as processing for scanning the even-numbered field. Although the display device 50 and the image processor 40 are shown as separate components in the arrangement of the display system SYS shown in FIG. 1, the present invention is not limited to this. The display device 50 may have the function of the image processor 40. That is, the image processor 40 may be a component of the display device 50 in addition to being a component forming the display system SYS. In other words, the display device 50 and the image processor 40 may be combined to form a "display device" according to the present invention.

Figure 3A:
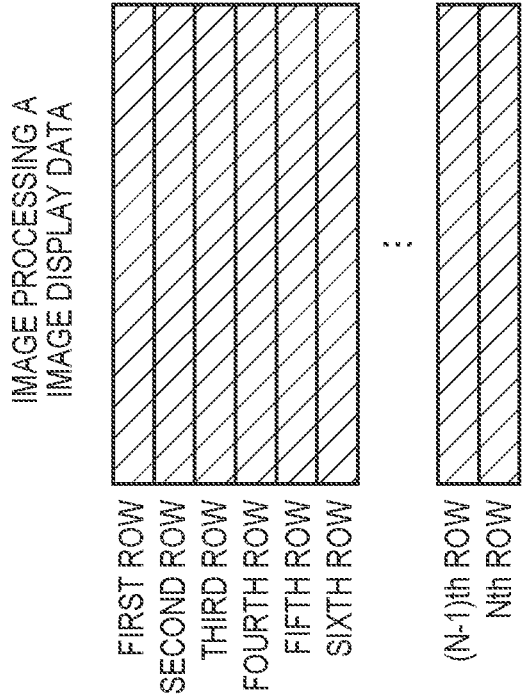
FIGS. 3A to 3D are views each showing an example of an operation of an image processor of the display device of FIG. 1.
Figure 3B:
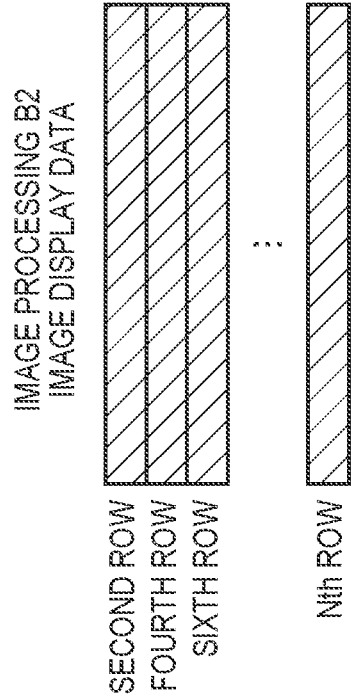
Figure 3C:
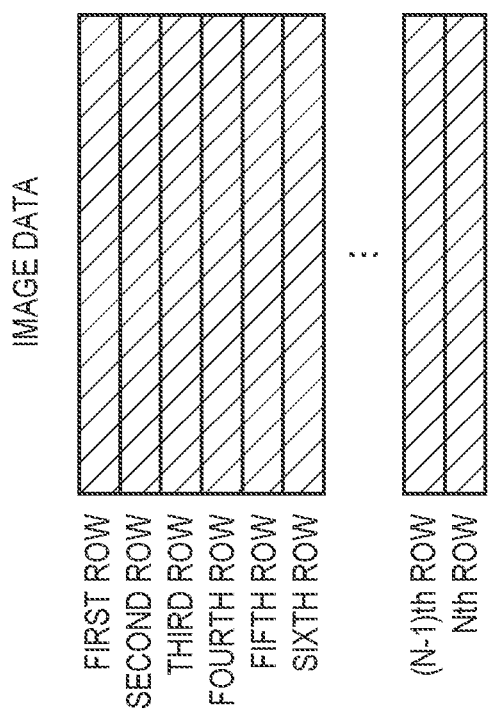
Figure 3D:
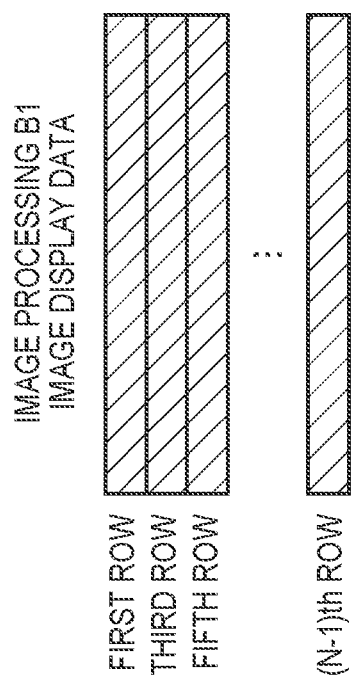

FIGS. 3A to 3D are views showing an example of image data transmitted from the image memory 10 to the image processor 40 and the image display data output from the image processor 40 in each image processing mode. As shown in FIG. 3A, the image data to be input to the image processor 40 is image data corresponding to N rows. For the sake of descriptive convenience, assume that N is a multiple of 2. In the image processing A, the image processor 40 outputs, as the image display data, the data of all the rows from the first row to the Nth row as shown in FIG. 3B. Hence, in the image processing A, the same data as the input image data can be output as the image display data. On the other hand, in each of the image processing B1 and the image processing B2, data different from the input image data is output as the image display data. In the image processing B1, the image processor 40 outputs, as the image display data to the display device 50, data extracted from odd-numbered rows, that is, the first row, the third row, the fifth row, . . . the (N−1)th row of the input image data as shown in FIG. 3C. Also, in the image processing B2, the image processor 40 outputs, as the image display data to the display device 50, data extracted from even-numbered rows, that is, the second row, the fourth row, the sixth row, . . . the Nth row of the input image data as shown in FIG. 3D.

The operation of the scanning circuit 200 according to each display mode will be described next. The scanning circuit 200 scans the pixel array 100 in accordance with a display mode selected among the plurality of display modes. For example, the scanning circuit 200 will operate in accordance with three types of scanning sequences which are a scanning sequence A, a scanning sequence B1, and a scanning sequence B2, and these scanning sequences are controlled by the control circuit 300.

When the display mode is the display mode A, the scanning circuit 200 will scan the pixel array 100 by one (type of) scanning sequence A. When the display mode is the display mode B, the scanning circuit 200 will repeatedly perform an operation unit formed by the scanning sequence B1 for scanning the odd-numbered field and the scanning sequence B2 for scanning the even-numbered field.

Figure 4:
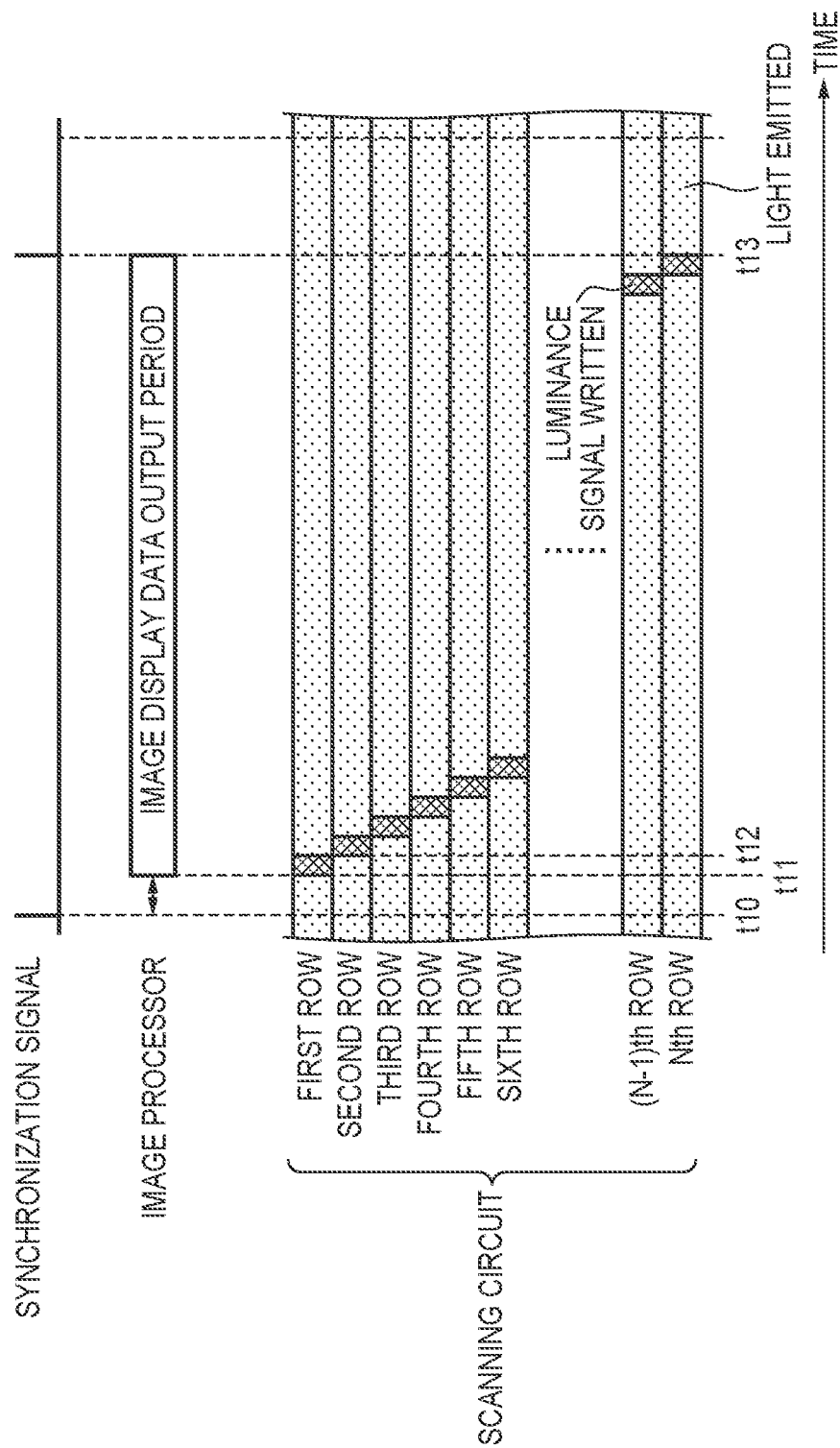
FIG. 4 is a view showing an example of an operation of a scanning circuit of the display device of FIG. 1.

FIG. 4 is a timing chart of scanning of one frame performed by the scanning circuit 200 in accordance with the scanning sequence A. A case in which the pixel array 100 is an organic EL display in which an organic EL element is arranged in each pixel 101 arranged on the pixel array 100 will be described. At time t10, a synchronization signal is output from the synchronization controller 30. At time t11 after a predetermined blanking period, the image processor 40 outputs the image display data to the display device 50. When the image display data is input to the display device 50, the scanning circuit 200 will start writing the luminance signal in each of the pixels 101 of the first row. Next, at time t12, the scanning circuit 200 will finish writing the luminance signal in each of the pixels 101 of the first row and cause the pixels 101 of the first row to start emitting light. Also, at time t12, the scanning circuit 200 will start writing the luminance signal in each of the pixels 101 of the second row. Subsequently, the scanning circuit 200 will perform the operation to write the luminance signal in each pixel 101 and the light emitting operation in the order of the first row, the second row, the third row, . . . the Nth row. At time t13, when the input of image display data from the image processor 40 to the display device 50 is completed, the scanning circuit 200 will complete the scanning operation up to the Nth row, and the pixels 101 corresponding to all the rows from the first row to the Nth row will be set in a light emitting state. The pixels 101 will continue to emit light until the operation to write the next luminance signal is executed again in the next frame. For example, the pixels 101 of the first row that started emitting light at time t12 will stop emitting light at time t11 of the next frame, and the luminance signal will be written again.

Figure 5A:
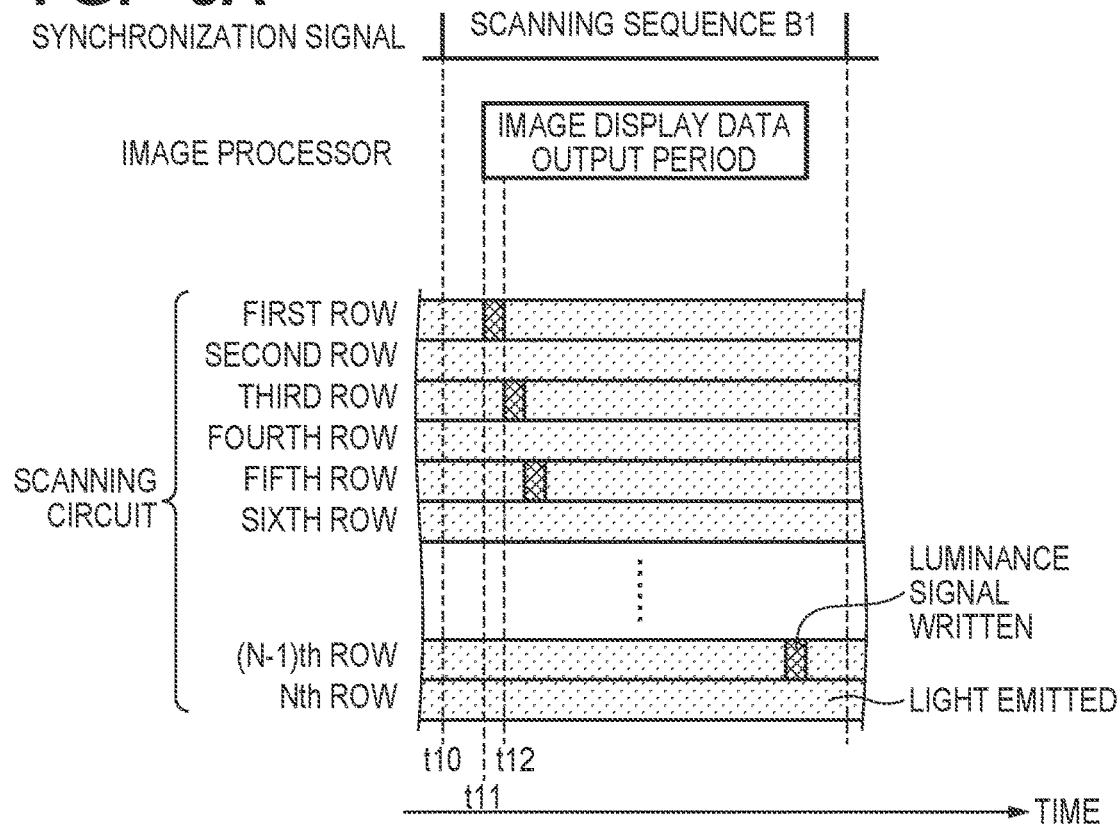
FIGS. 5A and 5B are views each showing an example of the operation of the scanning circuit of the display device of FIG. 1.
Figure 5B:
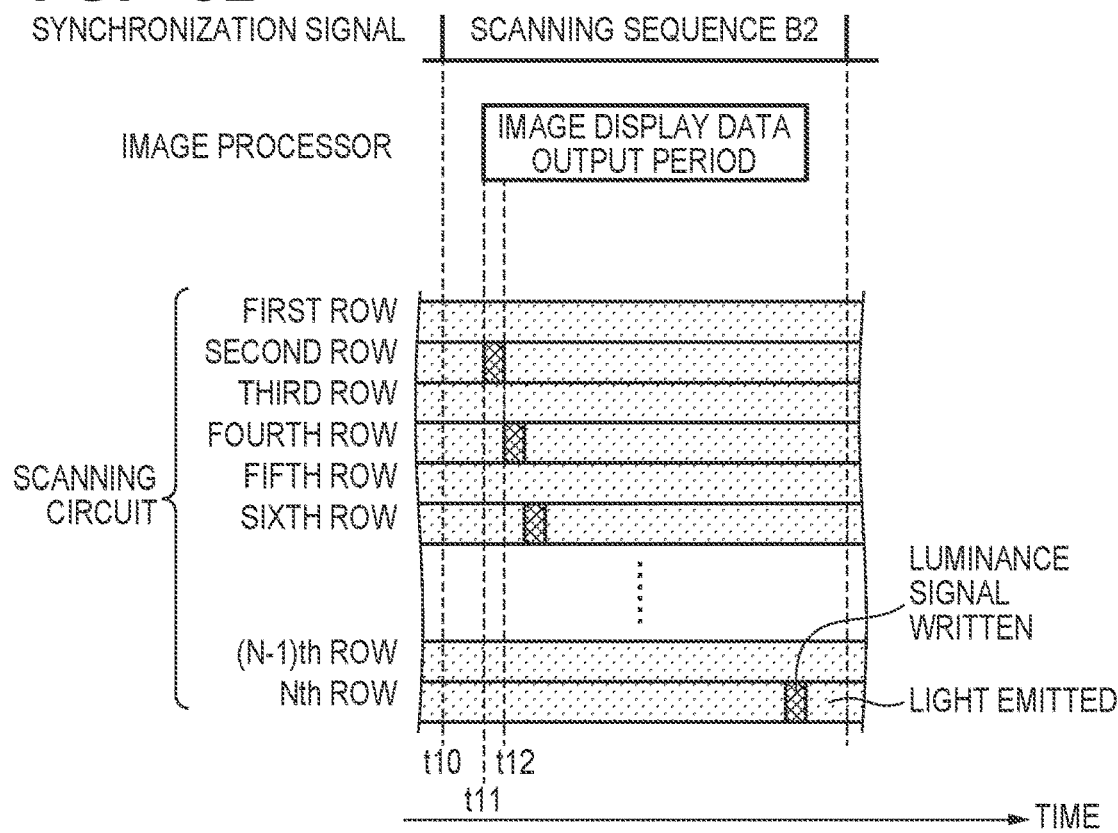

FIGS. 5A and 5B are timing charts of scanning of one field by the scanning circuit 200 in accordance with the scanning sequence B1 and the scanning sequence B2, respectively. FIG. 5A shows the scanning timings in the scanning sequence B1, and FIG. 5B shows the scanning timings in the scanning sequence B2.

Rows to be scanned in the scanning sequence B1 and scanning sequence B2 are different from the rows scanned in the scanning sequence A. Hence, it can be said that the scanning circuit 200 scans the pixel array 100 by different scanning sequences for the display mode A and the display mode B.

In the scanning sequence B1, the scanning circuit 200 will start scanning from time t11 at which the image display data is input to the display device 50, and will scan odd-numbered rows in the order of the first row, the third row, the fifth row, . . . the (N−1)th row. The pixels 101 of the second row, the fourth row, the sixth row, . . . the Nth row (even-numbered rows) in which the luminance signal will not be written will maintain emitting light corresponding to the luminance signal written in the previous frame. On the other hand, in the scanning sequence B2, the scanning circuit 200 will start scanning from time t11 when the image display data is input to the display device 50, and will scan even-numbered rows in the order of the second row, the fourth row, the sixth row, . . . the Nth row. The pixels 101 of the first row, the third row, the fifth row, . . . the (N−1)th row (odd-numbered rows) in which the luminance signal will not be written will maintain emitting light corresponding to the luminance signal written in the previous frame.

In this manner, in each of the scanning sequence B1 and the scanning sequence B2, the number of rows to undergo scanning is half of that of the scanning sequence A. Hence, the display rate of the display mode B for performing the scanning sequence B1 and the scanning sequence B2 will be higher than the display rate of the display mode A for performing the scanning sequence A. For example, a display rate which is double of that of the image processing A can be implemented in the display mode B.

In this embodiment, in the display mode B (the scanning sequence B1 and the scanning sequence B2), the scanning circuit 200 improves the display rate by scanning a portion of the pixel array 100. However, the method of improving the display rate is not limited to this. For example, the display rate may be improved in the scanning sequence B1 and the scanning sequence B2 by causing the scanning circuit 200 to simultaneously scan a plurality of rows of the pixel array 100.

Display mode switching between the display mode A and the display mode B according to the present invention will be described next. FIG. 6 is a timing chart showing the state when the display mode is switched. FIG. 6 shows an example of the operation of the display device 50 in a case in which the display rate of the display mode A is 60 Hz and the display rate of the display mode B is 120 Hz.

At time t20, a signal for selecting a display rate of 60 Hz (display mode A) is transmitted from the CPU 20. After a display mode instruction is issued from the CPU 20, the synchronization controller 30 outputs, from time t21, a synchronization signal at an interval of 60 Hz. At time t21, when the first synchronization signal is output after the display mode instruction is issued from the CPU 20, the image processor 40 executes the image processing A corresponding to the display mode A. The control circuit 300 also performs control so that the scanning circuit 200 will operate in accordance with the scanning sequence A.

Next, at time t22, a signal for selecting a display rate of 120 Hz (display mode B) is transmitted from the CPU 20. After a display mode change instruction is issued from the CPU 20, the synchronization controller 30 outputs, from time t23, the synchronization signal at an interval of 120 Hz. At time t23, when the first synchronization signal is output after the display mode change instruction is issued from the CPU 20, the image processor 40 executes the image processing B1 corresponding to the display mode B. The control circuit 300 also performs control so that the scanning circuit 200 will operate in accordance with the scanning sequence B1. At time t24, when the synchronization controller 30 outputs the next synchronization signal following the synchronization signal output at time t23, the image processor 40 executes the image processing B2. In addition, the control circuit 300 performs control so that the scanning circuit 200 will operate in accordance with the scanning sequence B2. Subsequently, the image processor 40 will perform the image processing B1 and the image processing B2 alternately in accordance with the synchronization signal output by the synchronization controller 30, and the control circuit 300 will cause the scanning circuit 200 to repeatedly perform scanning by alternating between the scanning sequence B1 and the scanning sequence B2.

At time t25, the signal for selecting the display rate of 60 Hz (display mode A) is transmitted again from the CPU 20. After the display mode change instruction is issued from the CPU 20, the synchronization controller 30 outputs, from time t26, the synchronization signal at an interval of 60 Hz. At time t26, when the first synchronization signal is output after the display mode change instruction is issued from the CPU 20, the image processor 40 executes the image processing A. The control circuit 300 also performs control to cause the scanning circuit 200 to operate in accordance with the scanning sequence A.

Furthermore, at time t27, the signal for selecting the display rate of 120 Hz (display mode B) is transmitted from the CPU 20. After the display mode change instruction is issued from the CPU 20, the synchronization controller 30 outputs, from time t28, the synchronization signal at an interval of 120 Hz. At time t28 and thereafter, after executing the image processing B1 in a manner similar to the operation performed in the period from time t23 to time t25, the image processor 40 will alternately perform the image processing B1 and the image processing B2 repeatedly in accordance with the synchronization signal. The control circuit 300 will also perform control to cause the scanning circuit 200 to start the operation of the display mode B by the image processing B1 in a manner similar to the operation performed in the period from time t23 to time t25. Subsequently, the control circuit 300 will cause the scanning circuit 200 to repeatedly perform scanning by alternating between the scanning sequence B1 and the scanning sequence B2 in accordance with the synchronization signal.

In this manner, when the display device 50 is to shift from the display mode A to the display mode B, the control circuit 300 controls the scanning circuit 200 so that the operation unit formed by the scanning sequence B1 and the scanning sequence B2 of the display mode B will be started from the scanning sequence B1. In addition, by also causing the image processor 40 to constantly start from the image processing B1 when the display mode is to shift from the display mode A to the display mode B, a normal odd-numbered field image can always be obtained upon switching to the display mode B. That is, since scanning will always be started by the same scanning sequence when the display mode is switched, the operation of the image processor 40 or the display device 50 need not be set to the initial state. Hence, this will suppress a state in which the image quality of the image displayed on the pixel array 100 will degrade due to the display image being interrupted because of the initialization of the image processor 40 or the display device 50. As a result, the display mode can be switched in the display device 50 without giving a sense of unnaturalness to the user.

For example, the display device 50 can be used as an electronic viewfinder (EVF) for an eyepiece viewfinder of a camera. Since the EVF needs to continuously operate during image capturing, more power is consumed than a camera that uses an optical viewfinder (OVF). Switching the display rate of the EVF in accordance with, for example, the operation state of a shutter button can be considered as a way of suppressing the power consumption. More specifically, the power consumption can be suppressed by raising the display rate when the shutter button is half-pressed and lowering the display rate when the shutter button is not pressed. If an image to be displayed on the EVF is interrupted momentarily when the user has half-pressed the shutter button, the user may get a sense of incongruity and miss the opportunity to capture an image. On the other hand, if the above-described control is employed, it will be possible to switch the display mode without giving the user a sense of unnaturalness. As a result, a display device 50 that can suppress power consumption and can avoid giving the user a sense of unnaturalness when the display mode is to be switched can be implemented.

Although the above embodiment described that the display mode will be switched between the display mode A and the display mode B as the two types of display modes, the present invention is not limited to this. The display mode may be switched between three or more types of display modes. In such a case, when the display mode is to be shifted to the display mode for repeating an operation unit formed by a plurality of scanning sequences from a display mode other than the display mode for repeating an operation unit formed by a plurality of scanning sequences among the plurality of display modes, the control circuit 300 can control the scanning circuit 200 so that the operation unit formed by the plurality of scanning sequences will be started from the same predetermined scanning sequence. This will allow display mode to be switched naturally in the display device 50.

FIG. 7 is a block diagram showing an example of the arrangement of the control circuit 300 according to the embodiment. The control circuit 300 includes a display mode synchronization circuit 301 and a 1-bit counter 302 which functions as a counter that counts the synchronization signal output from the synchronization controller 30. A display mode control signal is input from the CPU 20 to the display mode synchronization circuit 301. Based on the display mode control signal, the display mode synchronization circuit 301 outputs, to the scanning circuit 200, a display mode signal which is synchronized with the synchronization signal. The 1-bit counter 302 outputs, as a field signal, a result obtained by counting the synchronization signal. The maximum count value of the 1-bit counter 302 is 1. Counting will be started again from 0 if an overflow occurs. The display mode control signal is used to perform reset control on the 1-bit counter 302. Each scanning sequence executed by the scanning circuit 200 is controlled by the display mode signal and the field signal generated by the control circuit 300.

Figure 8:
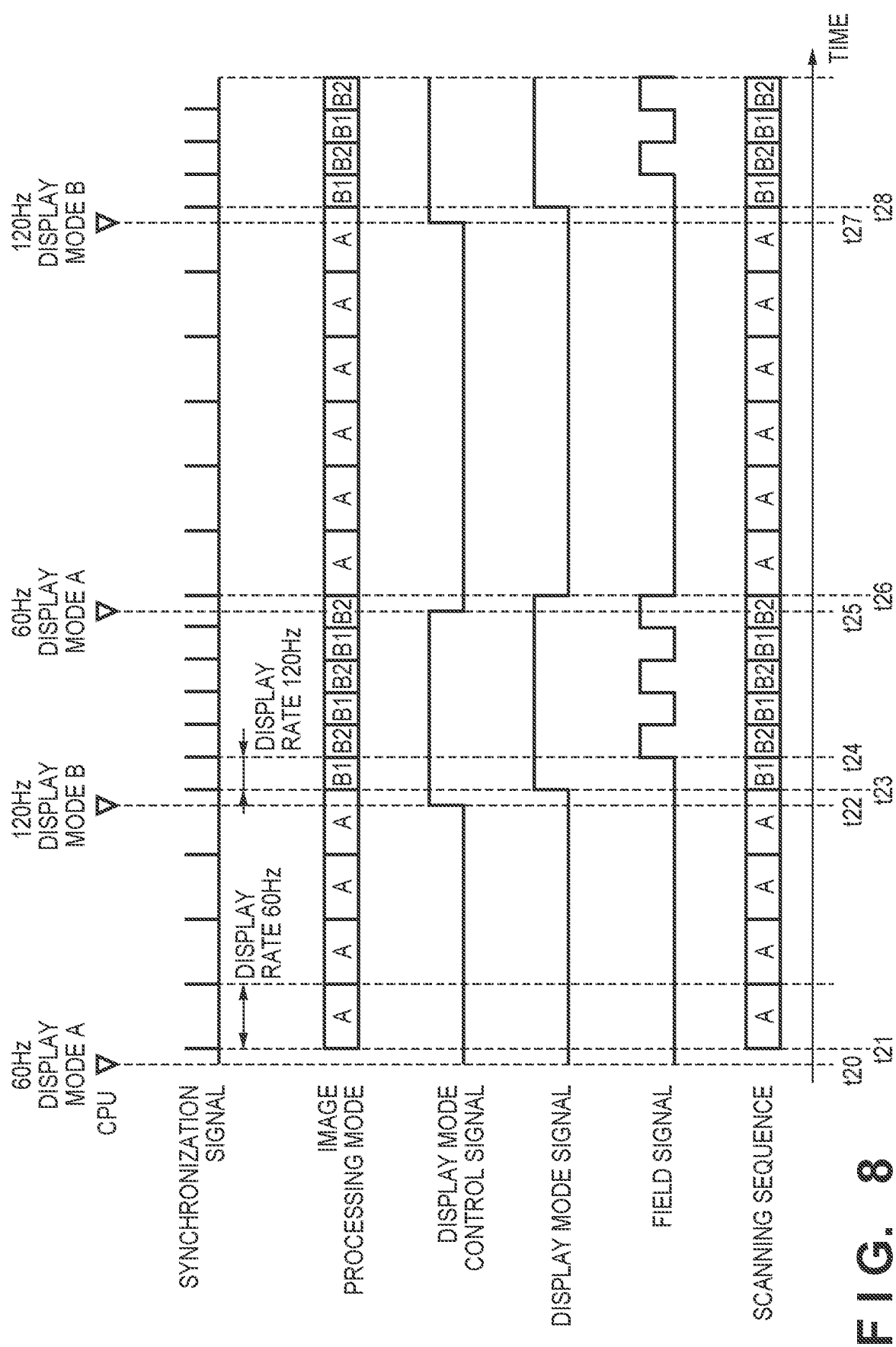
FIG. 8 is a timing chart showing an example of the operation of the display device of FIG. 1.

In FIG. 8, the display mode control signal output by the CPU 20 and the display mode signal and the field signal output by the display mode synchronization circuit 301 are shown in addition to the signals shown in the operation timing chart of FIG. 6. In the initial state, the display mode synchronization circuit 301 will set the display mode signal to low level. At this time, the 1-bit counter 302 will be reset, thus setting the field signal to low level.

At time t20, when the signal for selecting the display rate of 60 Hz (display mode A) is transmitted from the CPU 20, the display mode control signal will shift to low level. After the display mode instruction is issued from the CPU 20, the synchronization controller 30 will output, from time t21, the synchronization signal at an interval of 60 Hz. The display mode synchronization circuit 301 will output the display mode control signal as the display mode signal in synchronization with the synchronization signal. At this time, the display mode signal will remain at low level set in the initial state. When the display mode signal is at low level, the scanning circuit 200 will execute scanning of the pixel array 100 in accordance with the scanning sequence A. Also, in the display mode A, the 1-bit counter 302 as the counter will remain in the reset state and maintain the field signal at low level.

Next, at time t22, when the signal for selecting the display rate of 120 Hz (display mode B) is transmitted from the CPU 20, the display mode control signal will shift to high level. After an instruction is issued from the CPU 20, the synchronization controller 30 will output, from time t22, the synchronization signal at an interval of 120 Hz. The display mode synchronization circuit 301 will output the display mode control signal as the display mode signal in synchronization with the synchronization signal. Assume here that the display mode signal will shift to high level. The reset state of the 1-bit counter 302 is canceled in accordance with this shift. The 1-bit counter 302 will start operating when the next synchronization signal is input. Hence, the 1-bit counter 302 will set the field signal to low level at time t23 and set the field signal to high level at time t24. Subsequently, the 1-bit counter 302 will invert and output the field signal each time the synchronization signal is input. That is, the 1-bit counter 302 as a counter will start counting from the reset state in the display mode B. It can also be said that the 1-bit counter 302 will be reset when the display mode is to be shifted to the display mode B from a display mode other than the display mode B among the plurality of display modes. When the display mode signal is at high level, the scanning circuit 200 will determine the scanning sequence based on the field signal. When the field signal is at low level, the scanning circuit 200 will execute the scanning sequence B1. Also, when the field signal is at high level, the scanning circuit 200 will execute the scanning sequence B2. Hence, the scanning circuit 200 will operate in accordance with the scanning sequence B1 from time t23 and operate in accordance with the scanning sequence B2 from time t24. Subsequently, the scanning circuit 200 will repeatedly execute the scanning sequence B1 and the scanning sequence B2.

At time t25, when the signal for selecting a display rate of 60 Hz (display mode A) is transmitted again from the CPU 20, the display mode control signal will shift to low level. After an instruction is issued from the CPU 20, the synchronization controller 30 will output, from time t26, the synchronization signal at an interval of 60 Hz. Since the display mode control signal is low level, the display mode synchronization circuit 301 will set the display mode signal to low level. Hence, the scanning circuit 200 will execute the scanning sequence A. In addition, the 1-bit counter 302 will be reset at time t26, and the field signal will shift to low level.

At time t27, when a signal for selecting the display rate of 120 Hz (display mode B) is transmitted again from the CPU 20, the display mode control signal will shift to high level. In accordance with this shift, the control circuit 300 will execute an operation similar to that performed at time t23 and thereafter. That is, in the display mode B in which the 1-bit counter 302 will operate from the reset state and the operation unit formed by a plurality of scanning sequences including the scanning sequence B1 and the scanning sequence B2 will be repeatedly performed, the scanning circuit 200 will start scanning the pixel array 100 from the scanning sequence B1.

As described above, by using the control circuit 300, the display device 50 can synchronize with the synchronization signal to start the scanning sequence always from the scanning sequence B1 when the display mode is switched to the display mode B for repeatedly performing two scanning sequences as one operation unit. By arranging so that the image processor 40 will also start the operation in the display mode B from the image processing B1 in a similar manner, a normal odd-numbered field image can always be obtained when the display mode is switched to the display mode B. As a result, the image processor 40 and the display device 50 need not be set to the initial state when the display mode is to be switched. Hence, it will be possible to switch the display mode without giving the user a sense of unnaturalness due to an interruption of an image or the like. By using the control circuit 300 as shown in FIG. 7, it will be possible to implement the display device 50 that can suppress power consumption and will not give the user a sense of unnaturalness when the display mode is to be switched.

Although this embodiment described an example in which the 1-bit counter 302 as a counter is reset to "0" when the display mode is to be switched, a similar effect can be obtained by setting (resetting) the 1-bit counter 302 to "1" when the display mode is to be switched. In addition, although an example in which the scanning circuit 200 starts scanning from the scanning sequence B1 when the display mode is switched to the display mode B has been described, the scanning may be started from the scanning sequence B2.

The display mode B for repeatedly performing an operation unit formed by two scanning sequences has been exemplified as a display mode for repeatedly performing an operation unit formed by a plurality of scanning sequences. However, the number of scanning sequences each forming one operation unit need not be limited to two. For example, the display system SYS (display device 50) may operate by using the display mode B and a display mode C as the display modes. The display mode B is an operation as described as above. That is, in the display mode B, an image of one frame is divided into two fields formed by an odd-numbered field and an even-numbered field, and the image is displayed one field at a time at a predetermined frame rate. On the other hand, in the display mode C, an image of one frame is divided into four fields formed by a first field, a second field, a third field, and a fourth field, and the image is displayed one field at a time at a predetermined frame rate. That is, an operation unit formed by four scanning sequences is repeatedly performed in the display mode C. In this manner, the number of types of scanning sequences to be repeatedly performed in the display mode C may be greater than the number of types of scanning sequences to be repeatedly performed in the display mode B.

The operation of the image processor 40 to be performed in the display mode C will be described next. FIGS. 9A to 9E are views showing examples of the image data transmitted from the image memory 10 to the image processor 40 and the image display data output from the image processor 40 in each image processing mode. In the display mode C, the image processor 40 executes image processing C1 in the first field, image processing C2 in the second field, image processing C3 in the third field, and image processing C4 in the fourth field.

Figure 9A:
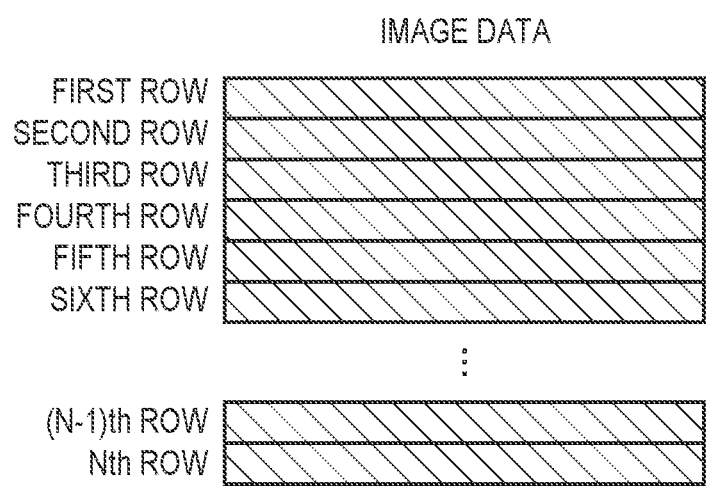
FIGS. 9A to 9E are views each showing an example of the operation of the image processor of the display device of FIG. 1.
Figure 9B:
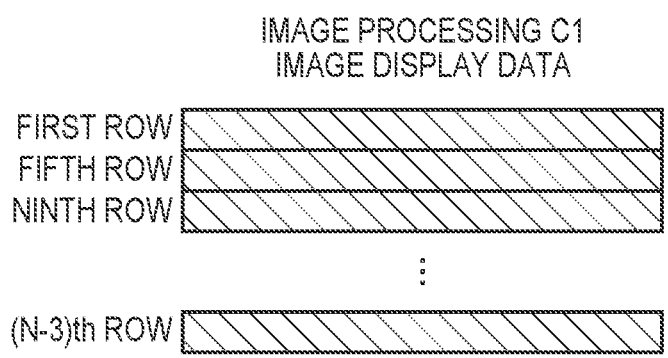
Figure 9C:
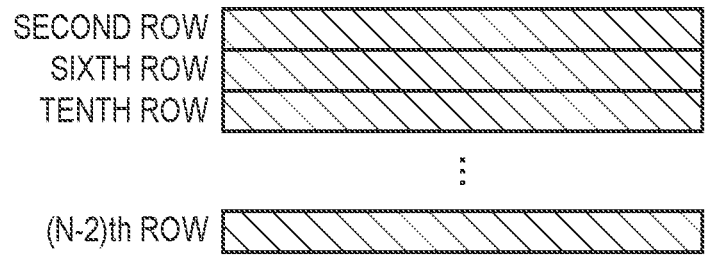
Figure 9D:
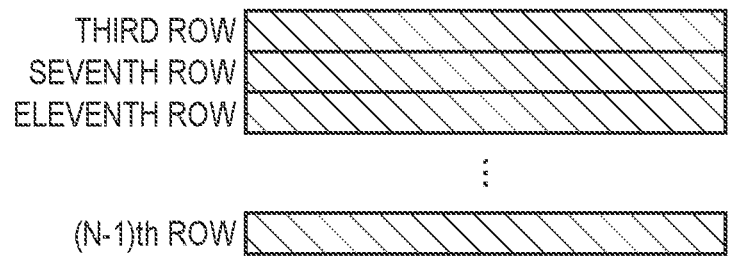
Figure 9E:
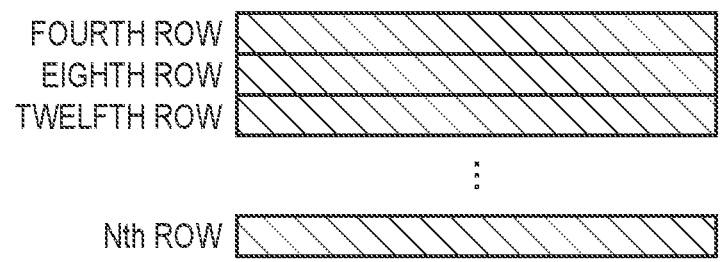

The image data input to the image processor 40 is image data corresponding to N rows as shown in FIG. 9A. For the sake of descriptive convenience, assume that N is a multiple of 4. In the image processing C1, the image processor 40 will output, as the image display data, data extracted every four rows, starting from the first row, in order from the first row, the fifth row, . . . the (N−3)th row as shown in FIG. 9B. In the image processing C2, the image processor 40 will output, as the image display data, data extracted every four rows, starting from the second row, in order from the second row, the sixth row, . . . the (N−2)th row as shown in FIG. 9C. In the image processing C3, the image processor 40 will output, as the image display data, data extracted every four rows, starting from the third row, in order from the third row, the seventh row, . . . the (N−1)th row as shown in FIG. 9D. In the image processing C4, the image processor 40 will output, as the image display data, data extracted every four rows, starting from the fourth row, in order from the fourth row, the eighth row, . . . the Nth row as shown in FIG. 9E.

The operation of the scanning circuit 200 according to the display mode C will be described next. In addition to the scanning sequence B1 and the scanning sequence B2 of the display mode B, the scanning circuit 200 will operate in accordance with four scanning sequences which are a scanning sequence C1, a scanning sequence C2, a scanning sequence C3, and a scanning sequence C4 of the display mode C. These scanning sequences will be controlled by the control circuit 300.

When the display mode is the display mode B, the scanning circuit 200 will repeatedly perform the operation unit which is formed by the scanning sequence B1 for scanning the odd-numbered field and the scanning sequence B2 for scanning the even-numbered field in a manner similar to that described above. In addition, when the display mode is the display mode C, the scanning circuit 200 will repeatedly perform an operation unit which is formed by the scanning sequence C1 for scanning the first field, the scanning sequence C2 for scanning the second field, the scanning sequence C3 for scanning the third field, and the scanning sequence C4 for scanning the fourth field.

FIGS. 10A to 10D are timing charts each showing the scanning of one field performed by the scanning circuit 200 in accordance with the display mode C. FIG. 10A shows the timings of the scanning sequence C1, FIG. 10B shows the timings of the scanning sequence C2, FIG. 10C shows the timings of the scanning sequence C3, and FIG. 10D shows the timings of the scanning sequence C4.

In the scanning sequence C1, the scanning circuit 200 will start scanning to write the luminance signal from time t11 when the image display data is input to the display device 50, and perform scanning in the order of the first row, the fifth row, . . . the (N−3)th row. Light emission corresponding to the luminance signal written in the pixels in the previous frame or before the previous frame is maintained for the other rows which will not undergo the luminance signal writing operation. In the scanning sequence C2, the scanning circuit 200 will start scanning to write the luminance signal from time t11 when the image display data is input to the display device 50, and perform scanning in the order of the second row, the sixth row, . . . the (N−2)th row. In a similar manner to the scanning sequence C1, light emission corresponding to the luminance signal written in the pixels in the previous frame or before the previous frame are maintained for the other rows which will not undergo the luminance signal writing operation. In a similar manner, the scanning circuit 200 will scan the third row, the seventh row, . . . the (N−2)th row in the scanning sequence C3 and scan the fourth row, the eighth row, . . . the Nth row in the scanning sequence C4.

In this manner, the number of rows which are to undergo scanning in each of the scanning sequences C1 to C4 will be half that of each of the scanning sequences B1 and B2. Hence, the display rate of the display mode C can become higher than the display rate of the display mode B. For example, a display rate which is double of that of the display mode B can be implemented by the display mode C.

An example of the control circuit 300 for implementing display according to the display mode C for repeatedly performing four scanning sequences as one operation unit will be described next. FIG. 11 is a block diagram showing an example of the arrangement of the control circuit 300 for causing the scanning circuit to repeatedly perform four scanning sequences as one operation unit. The control circuit 300 includes the display mode synchronization circuit 301, a 2-bit counter 303 which functions as a counter for counting the synchronization signal output from the synchronization controller 30, and a signal transition detecting circuit 304. A display mode control signal is input from the CPU 20 to the display mode synchronization circuit 301. Based on the display mode control signal, the display mode synchronization circuit 301 outputs a display mode signal that has been synchronized with the synchronization signal to the scanning circuit 200. The 2-bit counter 303 outputs a result obtained by counting the synchronization signal as a field signal. The maximum count value of the 2-bit counter 303 is 3. Counting will be restarted from 0 when an overflow occurs. In addition, a reset signal output from the signal transition detecting circuit 304 is used to perform reset control on the 2-bit counter 303. The signal transition detecting circuit 304 outputs the reset signal upon detecting a logical change in the display mode. The scanning sequence of the scanning circuit 200 is controlled by the display mode signal and the field signal generated by the control circuit 300.

Figure 12:
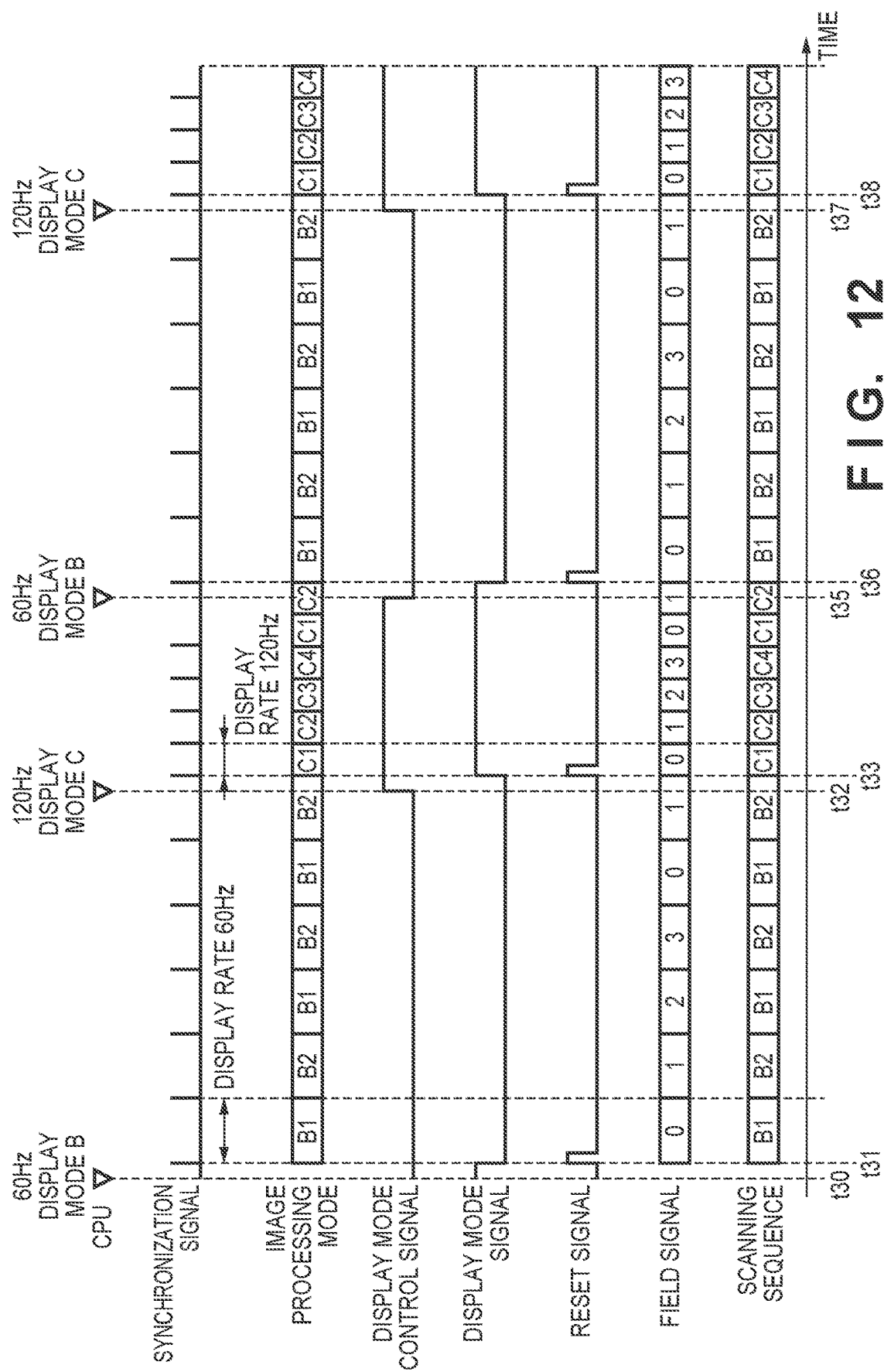
FIG. 12 is a timing chart showing an example of the operation of the display device of FIG. 1.

FIG. 12 shows a timing chart of the operation of the display device 50 when the display mode is switched between the display mode B and the display mode C. FIG. 12 shows a case in which the display rate of the display mode B is 60 Hz and the display rate of the display mode C is 120 Hz.

In the initial state, the display mode synchronization circuit 301 will set the display mode signal to high level. At time t30, when a signal for selecting the display rate of 60 Hz (display mode B) is transmitted from the CPU 20, the display mode control signal will shift to low level. After an instruction is issued from the CPU 20, the synchronization controller 30 will output, from time t31, the synchronization signal at an interval of 60 Hz. At time t31, when the first synchronization signal is output after an instruction is issued from the CPU 20, the image processor 40 will execute the image processing B1. In addition, the display mode synchronization circuit 301 will output the display mode control signal as the display mode signal in synchronization with the synchronization signal. Hence, the display mode signal will shift from high level to low level. The signal transition detecting circuit 304 will detect the transition of the display mode signal and output the reset signal in the form of pulses. This will reset the 2-bit counter 303, and the field signal will change to 0. That is, in the display mode B for repeatedly performing two scanning sequences as one operation unit, the 2-bit counter 303 will start counting from the reset state. As a result, the scanning circuit 200 will start scanning in the display mode B from the scanning sequence B1.

Subsequently, when the synchronization controller 30 outputs the synchronization signal, the image processor 40 will alternately perform the image processing B1 and the image processing B2 repeatedly. The 2-bit counter will also count the synchronization signal and output the result as the field signal. At this time, in a period when the display mode signal is at low level, the scanning circuit 200 will execute the scanning sequence B1 when the field signal is 0 or 2 and execute the scanning sequence B2 when the field signal is 1 or 3. Hence, at time t31 and thereafter, the scanning circuit 200 will repeatedly perform the scanning sequence B1 and the scanning sequence B2.

Next, at time t32, when the signal for selecting the display rate of 120 Hz (display mode C) is transmitted from the CPU 20, the display mode control signal will shift to high level. After an instruction is issued from the CPU 20, the synchronization controller 30 will output, from time t33, the synchronization signal at an interval of 120 Hz. The display mode synchronization circuit 301 will output the display mode control signal as the display mode signal in synchronization with the synchronization signal. Hence, the display mode signal will shift from low level to high level. The signal transition detecting circuit 304 will output the reset signal upon detecting the transition of the display mode signal. This will reset the 2-bit counter 303, and the field signal will change to 0. That is, the 2-bit counter 303 as a counter will start counting from the reset state in the display mode C for repeatedly performing four scanning sequences as one operation unit. It may be said that the 2-bit counter 303 is reset when the display mode shifts to the display mode C from a display mode other than the display mode C among the plurality of display modes. As a result, the scanning circuit 200 will start scanning in the display mode C from the scanning sequence C1.

Subsequently, when the synchronization controller 30 outputs the synchronization signal, the image processor 40 will sequentially perform the image processing C1 to image processing C4 repeatedly. The 2-bit counter will count the synchronization signal and output the result as the field signal. In a period when the display mode signal is at high level, the scanning circuit 200 will execute the scanning sequence C1 when the field signal is 0, the scanning sequence C2 when the field signal is 1, the scanning sequence C3 when the field signal is 2, and the scanning sequence C4 when the field signal is 3. Hence, at time t33 and thereafter, the scanning circuit 200 will sequentially execute the scanning sequences C1 to C4 repeatedly.

At time t35, when the signal for selecting the display rate of 60 Hz (display mode B) is transmitted again from the CPU 20, the display mode control signal will shift to low level. After an instruction is issued from the CPU 20, the synchronization controller 30 will output, from time t36, the synchronization signal at an interval of 60 Hz. The display mode synchronization circuit 301 will output the display mode control signal as the display mode signal in synchronization with the synchronization signal. Hence, the display mode signal will shift from high level to low level. At this time, the signal transition detecting circuit 304 will reset the 2-bit counter 303, and the field signal will change to 0. Accordingly, at time t36 and thereafter, an operation similar to that performed at time t31 and thereafter will be performed.

Furthermore, at time t37, when the signal for selecting the display rate of 120 Hz (display mode C) is transmitted again from the CPU 20, the display mode control signal will shift to low level. After an instruction is issued from the CPU 20, the synchronization controller 30 will output, from time t38, the synchronization signal at an interval of 120 Hz. The display mode synchronization circuit 301 will output the display mode control signal as the display mode signal in synchronization with the synchronization signal. Hence, the display mode signal will shift from low level to high level. The signal transition detecting circuit 304 will reset the 2-bit counter 303, and the field signal will change to 0. Accordingly, at time t38 and thereafter, an operation similar to that performed at time t33 and thereafter will be performed.

In this manner, when the display mode is to be switched between two different display modes for scanning a plurality of fields, the display device 50 can start an operation unit formed by a plurality of scanning sequences by the same specific scanning sequence in either of the display modes. As a result, the image processor 40 and the display device 50 need not be set to the initial state when the display mode is to be switched. Hence, the display mode can be switched naturally.

The above embodiment described an example in which the 2-bit counter 303 as a counter is reset to "0" when the display mode is to be switched. However, a similar effect can be obtained even when the value is set (reset) to a value other than "0". In addition, although this embodiment described a case that includes a common counter for the display mode B and the display mode C, an independent counter may also be arranged for each display mode. In such a case, although two or more counters will be needed in accordance with the number of display modes for repeatedly performing an operation unit formed by a plurality of scanning sequence, it will be sufficient to arrange a counter that can count the number of fields to be scanned for each display mode.

Each display mode described in the above embodiment is merely an example. A similar effect can be obtained when the display mode is to be switched as long as at least one display mode for repeatedly performing an operation unit formed by a plurality of scanning sequences is included. Hence, the number of display modes, the number of fields included in each display mode, and the generation method of field data are not particularly limited. For example, it may be arranged so that the display device 50 will perform a display operation by appropriately switching between the above-described three display modes of the display mode A, the display mode B, and the display mode C. In addition, it may be arranged so that the display device 50 will perform a display operation by switching between four or more types of display modes.

Application examples in which the display device 50 (display system SYS) according to this embodiment has been applied to a photoelectric conversion device, an electronic device, an illumination device, a moving body, and a wearable device will be described with reference to FIGS. 13 to 19. In addition, the display device 50 (display system SYS) can be used as an exposure light source of an electrophotographic image forming device, the backlight of a liquid crystal display device, a light emitting device including a color filter in a white light source, and the like. The display device 50 (display system SYS) may be an image information processing device that includes an image input unit for inputting image information from an area CCD, a linear CCD, a memory card, or the like, and an information processor for processing the input information, and displays the input image on a display unit. In addition, a display unit included in a camera or an inkjet printer may have a touch panel function. The driving type of the touch panel function may be an infrared type, a capacitance type, a resistive film type, or an electromagnetic induction type, and is not particularly limited. The display device may be used for the display unit of a multifunction printer.

Figure 13:
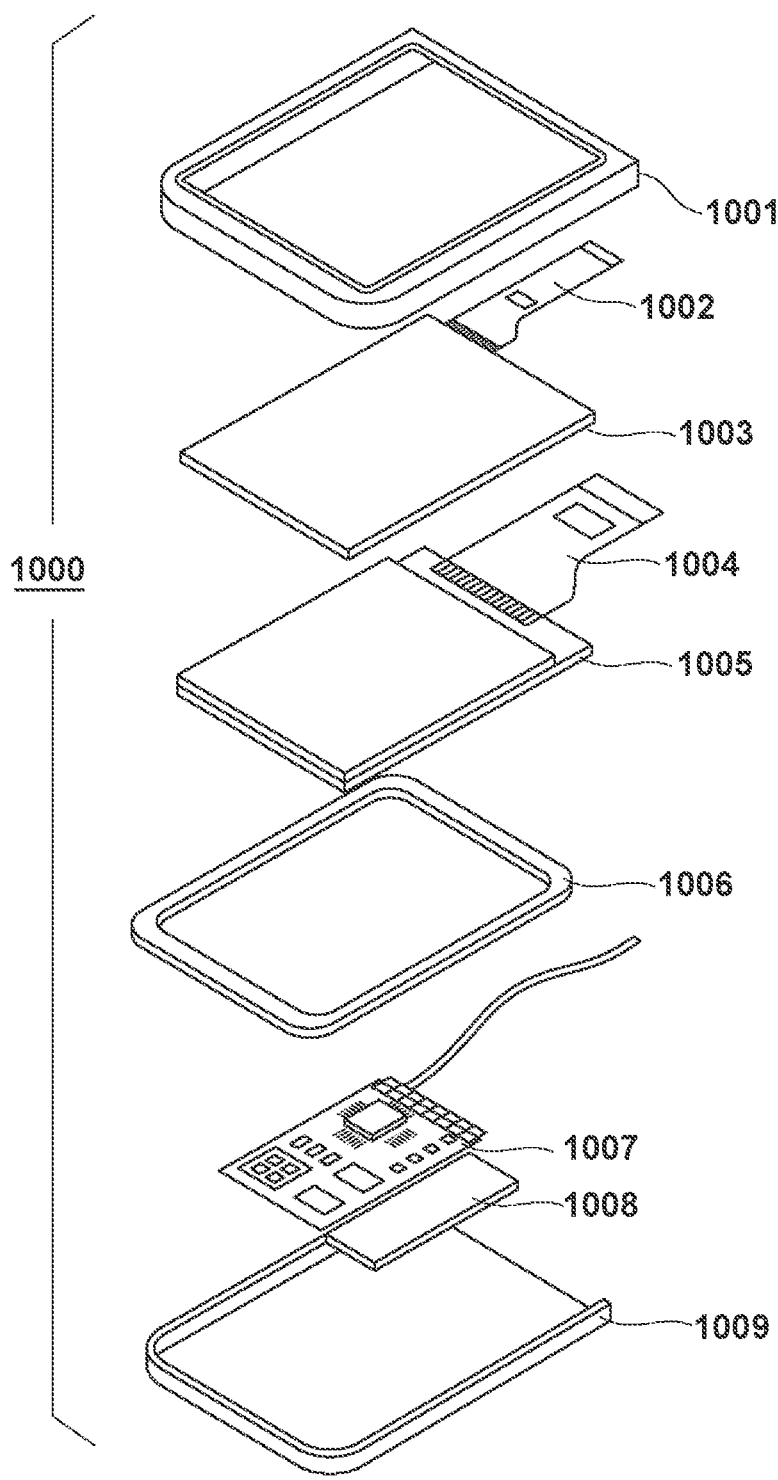
FIG. 13 is a view showing an application example of the display device of FIG. 1.

FIG. 13 is a schematic view showing an example of the display device using the display device 50 (display system SYS) according to this embodiment. A display device 1000 shown in FIG. 13 can include a touch panel 1003, a display panel 1005, a frame 1006, a circuit board 1007, and a battery 1008 between an upper cover 1001 and a lower cover 1009.

When an image is to be displayed on the display panel 1005 of the display device 1000, image display may be performed by switching the display mode in the above-described manner in accordance with the image quality of the image to be displayed or the like. Flexible printed circuits (FPCs) 1002 and 1004 are respectively connected to the touch panel 1003 and the display panel 1005. Active elements such as transistors are arranged on the circuit board 1007. The battery 1008 is unnecessary if the display device 1000 is not a portable device. Even when the display device 1000 is a portable device, the battery 1008 need not be provided in this position.

The display device 1000 shown in FIG. 13 may also be used as a display unit of a photoelectric conversion device (image capturing device) including an optical unit having a plurality of lenses, and an image capturing element for receiving light having passed through the optical unit and photoelectrically converting the light into an electrical signal. The photoelectric conversion device can include a display unit for displaying information acquired by the image capturing element. In addition, the display unit may be a display unit exposed outside the photoelectric conversion device or a display unit arranged in the viewfinder. The photoelectric conversion device may also be a digital camera or a digital video camera.

Figure 14:
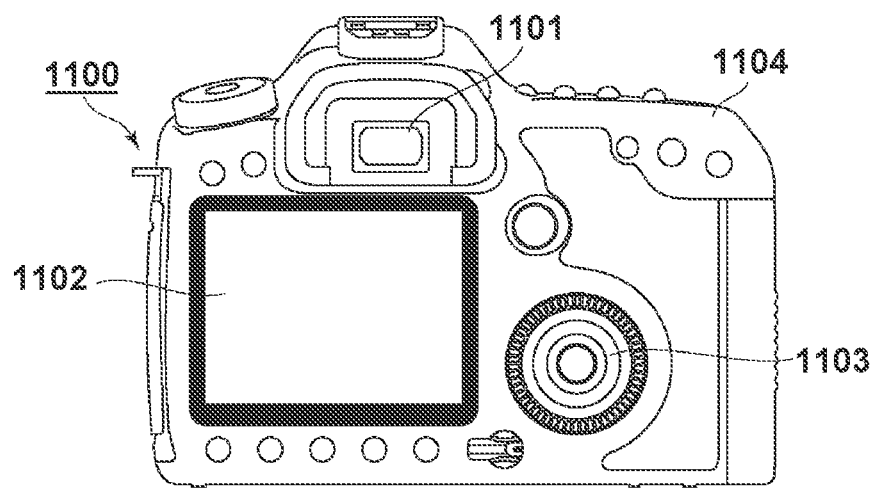
FIG. 14 is a view showing an example of a photoelectric conversion device using the display device of FIG. 1.

FIG. 14 is a schematic view showing an example of the photoelectric conversion device using the display device 50 (display system SYS) according to this embodiment. A photoelectric conversion device 1100 can include a viewfinder 1101, a rear display 1102, an operation unit 1103, and a housing 1104. The photoelectric conversion device 1100 can also be referred to as an image capturing device. The above-described display device 50 (display system SYS) is applicable to the viewfinder 1101 as a display unit. The above-described display device 50 (display system SYS) may also be applied to the back display 1102. In these cases, the display device 50 can display not only an image to be captured but also environment information, image capturing instructions, and the like. Examples of the environment information are the intensity and direction of external light, the moving velocity of an object, and the possibility that an object is shielded by a shielding object.

The timing suitable for image capturing is often a very short time, so the information is preferably displayed as quickly as possible. Accordingly, the above-described display device 50 (display system SYS) which contains an organic light emitting material such as an organic EL element as a light emitting element can be used as the viewfinder 1101. This is because the organic light emitting material has a high response speed. For these devices that require display speed, the display device 50 (display system SYS) using the organic light emitting material can be used more suitably than a liquid crystal display device.

The photoelectric conversion device 1100 includes an optical unit (not shown). This optical unit has a plurality of lenses, and forms an image of light having passed through the optical unit on a photoelectric conversion element (not shown) that is accommodated in the housing 1104 and receives the light. The focal points of the plurality of lenses can be adjusted by adjusting the relative positions. This operation can also be automatically performed.

The display device 50 (display system SYS) may be applied to the display unit of the electronic device. At this time, the display device 50 can have both a display function and an operation function. Examples of the portable terminal are a portable phone such as a smartphone, a tablet, and a head mounted display.

Figure 15:
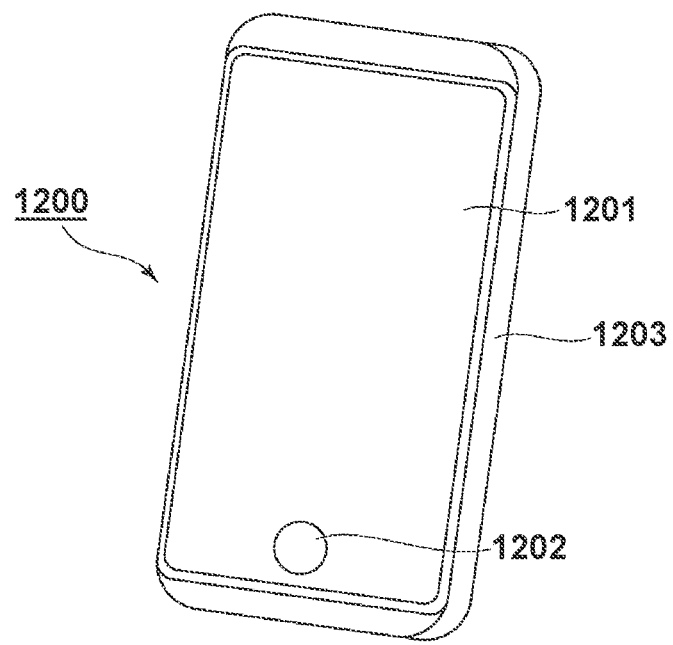
FIG. 15 is a view showing an example of an electronic device using the display device of FIG. 1.

FIG. 15 is a schematic view showing an example of the electronic device using the display device 50 (display system SYS) according to this embodiment. An electronic device 1200 includes a display unit 1201, an operation unit 1202, and a housing 1203. The housing 1203 can accommodate a circuit, a printed board having this circuit, a battery, and a communication unit. The operation unit 1202 may be a button or a touch-panel-type reaction unit. The operation unit 1202 can also be a biometric authentication unit that performs unlocking or the like by authenticating the fingerprint. A portable device including a communication unit can also be regarded as a communication device. The above-described display device 50 (display system SYS) is applicable to the display unit 1201.

Figure 16A:
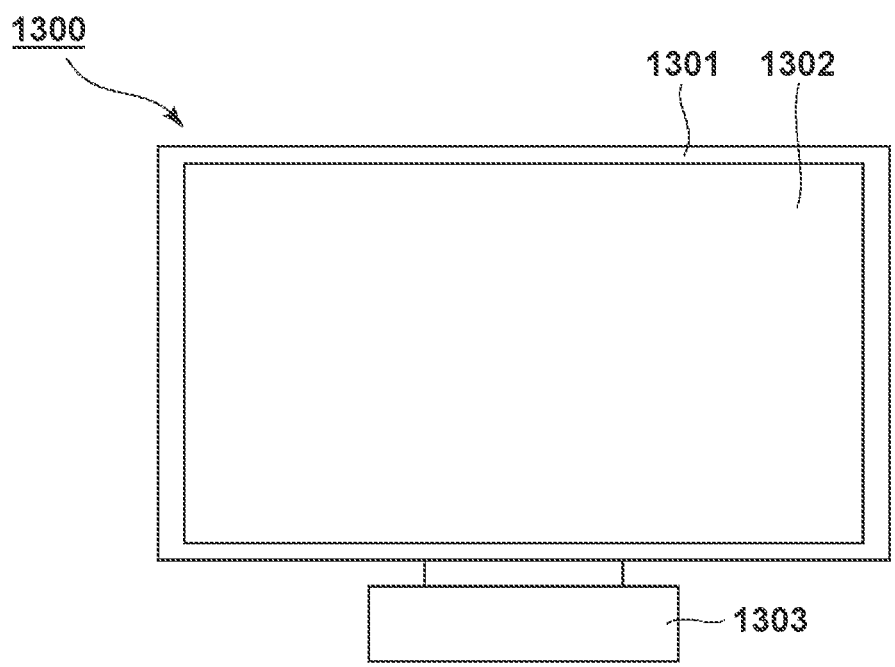
FIGS. 16A and 16B are views each showing an example of a display device using the display device of FIG. 1.
Figure 16B:
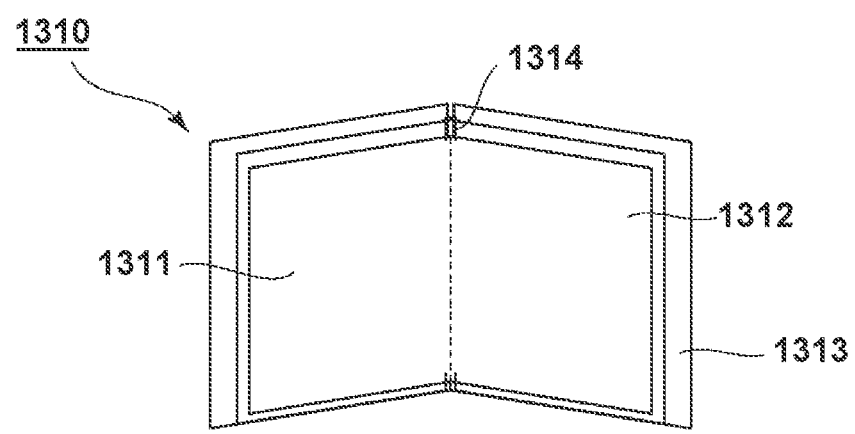

FIGS. 16A and 16B are schematic views showing examples of the display device using the display device 50 (display system SYS) according to this embodiment. FIG. 16A shows a display device such as a television monitor or a PC monitor. A display device 1300 includes a frame 1301 and a display unit 1302. When an image is to be displayed on the display unit 1302 of the display device 1300, image display may be performed by switching the display mode in the above-described manner in accordance with the image quality of the image to be displayed or the like. The display device 1300 may also include a base 1303 that supports the frame 1301 and the display unit 1302. The base 1303 is not limited to the form shown in FIG. 16A. For example, the lower side of the frame 1301 may also function as the base 1303. In addition, the frame 1301 and the display unit 1302 may be bent. The radius of curvature in this case can be 5,000 mm or more to 6,000 mm or less.

FIG. 16B is a schematic view showing another example of the display device using the display device 50 (display system SYS) according to this embodiment. A display device 1310 shown in FIG. 16B can be folded, that is, the display device 1310 is a so-called foldable display device. The display device 1310 includes a first display unit 1311, a second display unit 1312, a housing 1313, and a bending point 1314. When an image is to be displayed on the first display unit 1311 or the second display unit 1312 of the display device 1310, image display may be performed by switching the display mode in the above-described manner in accordance with the image quality of the image to be displayed or the like. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 17:
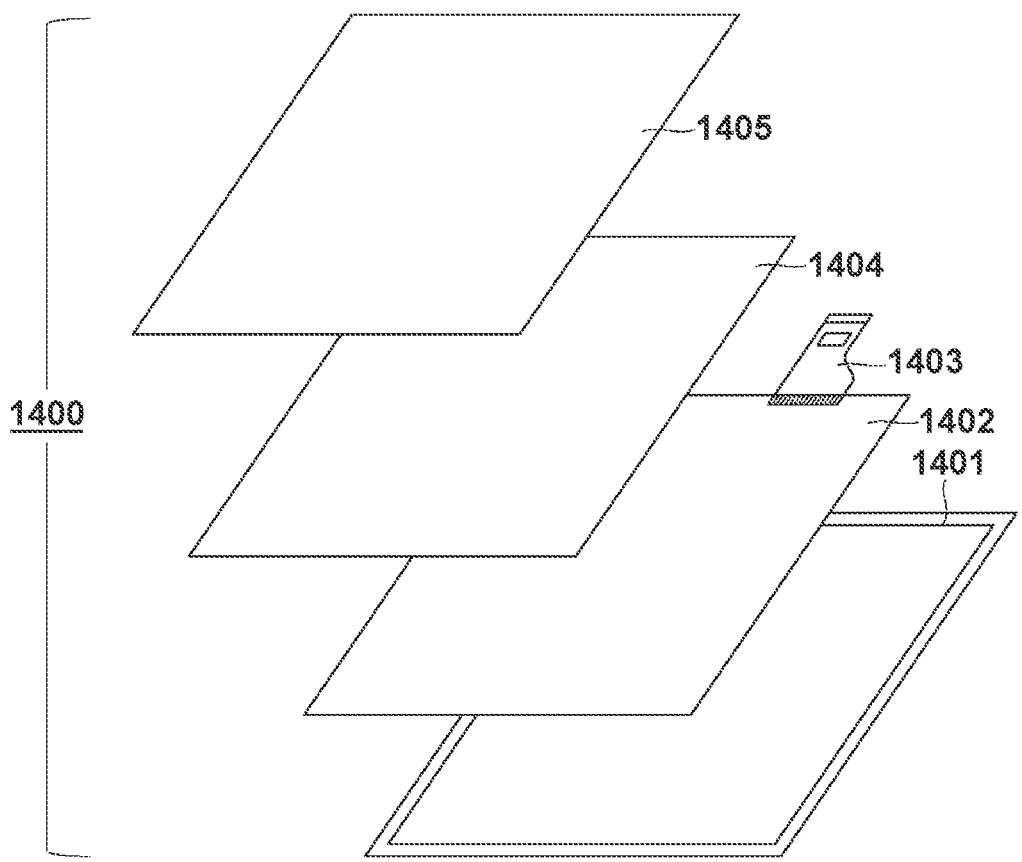
FIG. 17 is a view showing an example of an illumination device using the display device of FIG. 1.

FIG. 17 is a schematic view showing an example of the illumination device using the display device 50 (display system SYS) according to this embodiment. An illumination device 1400 can include a housing 1401, a light source 1402, a circuit board 1403, an optical film 1404, and a light diffusing unit 1405. The above-described display device 50 (display system SYS) is applicable to the light source 1402. The optical film 1404 can be a filter that improves the color rendering of the light source. During illumination or the like, the light diffusing unit 1405 can throw the light of the light source over a broad range by effectively diffusing the light. The illumination device 1400 can also include a cover on the outermost portion, as needed. The illumination device 1400 may include both the optical film 1404 and the light diffusing unit 1405 or include only one of them.

The illumination device 1400 is, for example, a device for illuminating the room or the like. The illumination device 1400 can emit white light, natural white light, or light of any color from blue to red. The illumination device 1400 can also include a light control circuit for controlling these light components. The illumination device 1400 can also include a power supply circuit to be connected to the display device 50 (display system SYS) that functions as the light source 1402. This power supply circuit can be a circuit for converting an AC voltage into a DC voltage. "White" has a color temperature of 4,200 K, and "natural white" has a color temperature of 5,000 K. The illumination device 1400 may also have a color filter. In addition, the illumination device 1400 can have a heat radiation unit. The heat radiation unit radiates the internal heat of the device to the outside of the device, and examples are a metal having a high specific heat and liquid silicon.

Figure 18:
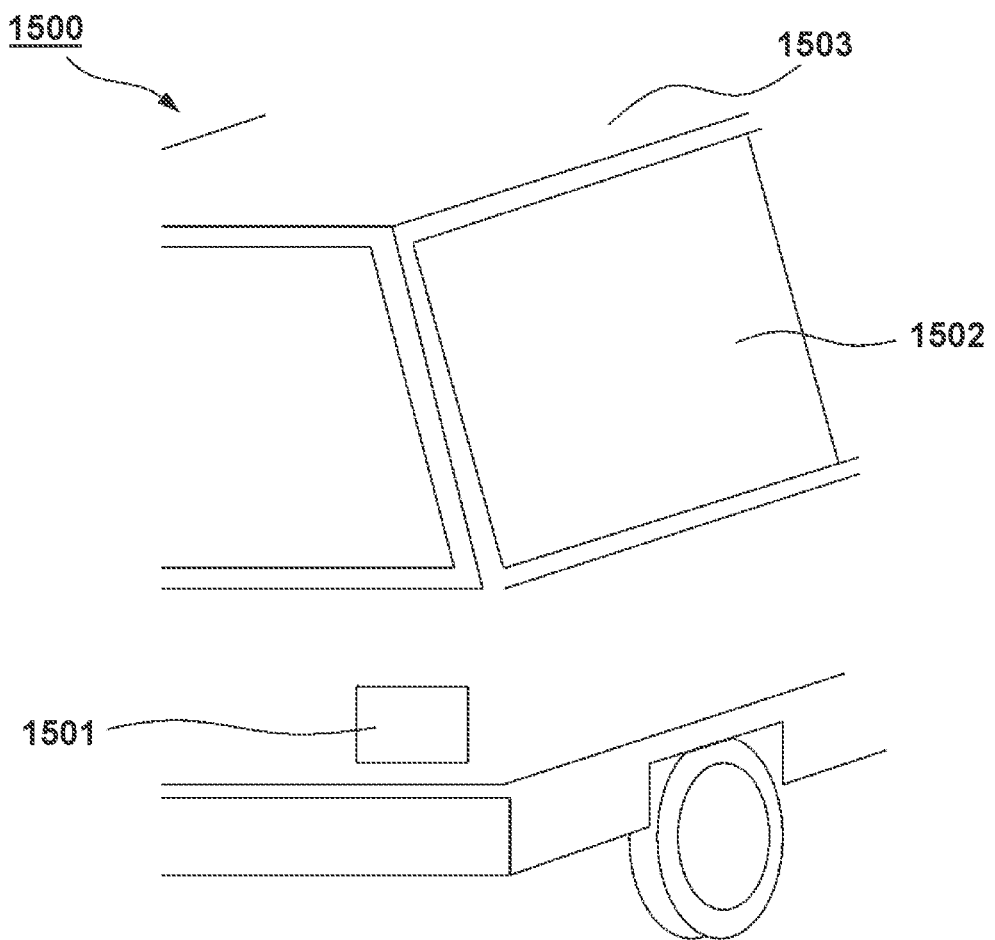
FIG. 18 is a view showing an example of a moving body using the display device of FIG. 1.

FIG. 18 is a schematic view of an automobile including a taillight as an example of a vehicle lighting appliance using the display device 50 (display system SYS) according to this embodiment. An automobile 1500 has a taillight 1501, and the taillight 1501 may be turned on when performing a braking operation or the like. The display device 50 (display system SYS) according to this embodiment may be used as a headlight serving as a vehicle lighting appliance. The automobile is an example of a moving body, and the moving body may be a ship, a drone, an airplane, a railway vehicle, an industrial robot such as an automated guided vehicle (AGV), or the like. The moving body can include a main body and a lighting appliance installed in the main body. The lighting appliance may also be a device that sends a notification of the current position of the main body.

The above-described display device 50 (display system SYS) is applicable to the taillight 1501. The taillight 1501 can have a protection member for protecting the display device 50 (display system SYS) that functions as the taillight 1501. The material of the protection member is not limited as long as the material is a transparent material with a strength that is high to some extent, and can be polycarbonate. The protection member can also be formed by mixing a furandicarboxylic acid derivative or an acrylonitrile derivative in polycarbonate.

The automobile 1500 can include a body 1503, and a window 1502 attached to the body 1503. This window can be a window for checking the front and back of the automobile, and can also be a transparent display. The above-described display device 50 (display system SYS) can be used as this transparent display. In this case, the constituent materials such as the electrodes of the display device 50 are formed by transparent members. The display device 50 (display system SYS) may be used as an instrument panel, an image display unit of a car navigation system, and the like of the automobile 1500.

Further application examples of the display device 50 (display system SYS) according to each above-described embodiment will be described with reference to FIGS. 19A and 19B. The display device 50 (display system SYS) is applicable to, for example, a system that can be worn as a wearable device such as smart glasses, an HMD, smart contact lenses, or the like. The display device 50 (display system SYS) that can be used in such an application example can include an image capturing device which can photoelectrically convert visible light and the display device 50 (display system SYS) which can emit visible light.

Figure 19A:
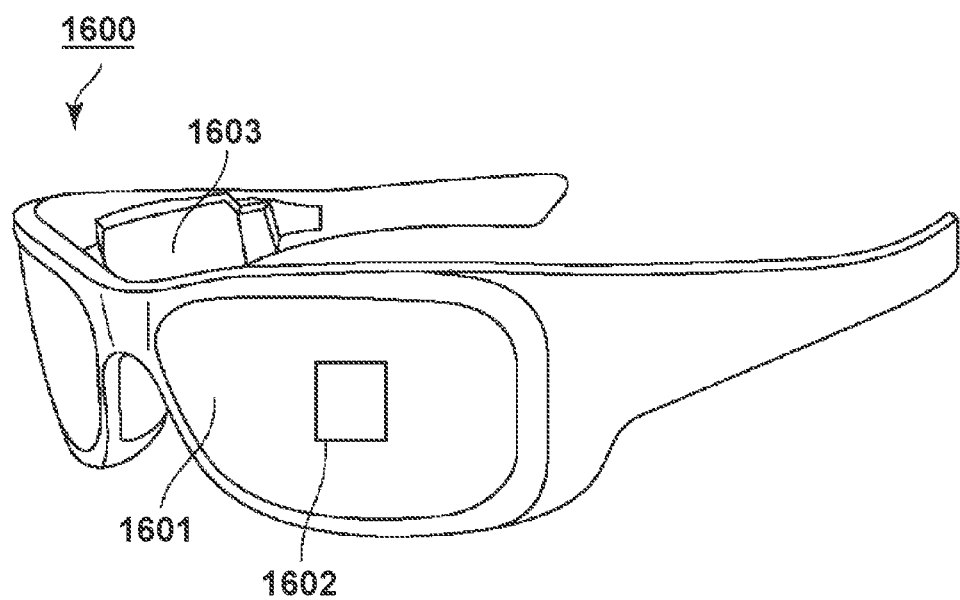
FIGS. 19A and 19B are views each showing an example of a wearable device using the display device of FIG. 1.

FIG. 19A illustrates a pair of glasses 1600 (smart glasses) according to an application example. An image capturing device 1602 such as a CMOS sensor or an SPAD is arranged on the front surface side of a lens 1601 of the glasses 1600. Also, the display device 50 (display system SYS) according to the embodiments described above is arranged on the back surface side of the lens 1601.

The pair of glasses 1600 further includes a control device 1603. The control device 1603 functions as a power supply that supplies power to the image capturing device 1602 and the display device 50 (display system SYS) according to each embodiment. The control device 1603 also controls the operation of the image capturing device 1602 and the operation of the display device. An optical system for focusing light to the image capturing device 1602 is formed on the lens 1601.

Figure 19B:
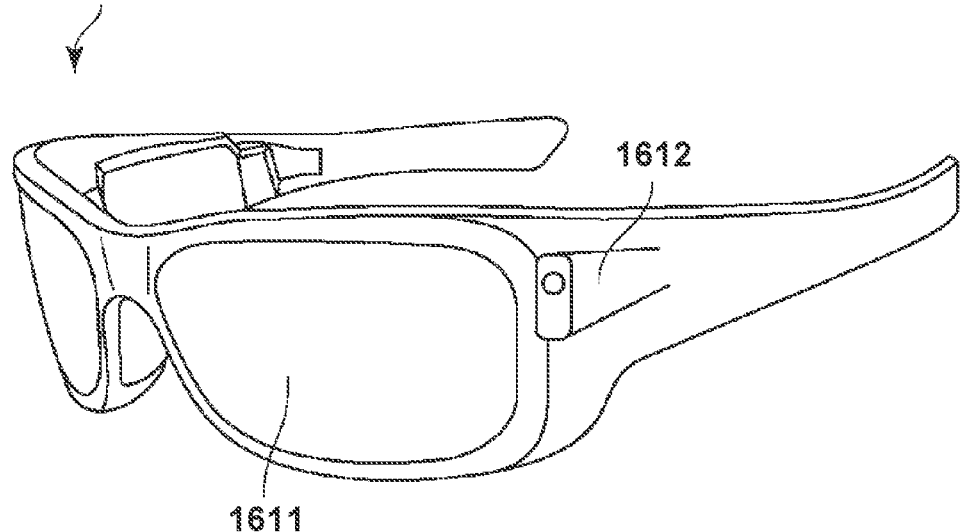

FIG. 19B illustrates a pair of glasses 1610 (smart glasses) according to another application example. The pair of glasses 1610 includes a control device 1612, and an image capturing device corresponding to the image capturing device 1602 and the display device 50 (display system SYS) are incorporated in the control device 1612. An image capturing device in the control device 1612 and an optical system for projecting light emitted from the display device 50 (display system SYS) are formed on a lens 1611, and an image is projected to the lens 1611. In addition to functioning as a power supply that supplies power to the image capturing device and the display device, the control device 1612 also controls the operation of the image capturing device and the operation of the display device 50 (display system SYS). The control device can also include a line-of-sight detection unit that detects the line of sight of a wearer of the smart glasses. Infrared light can be used for line-of-sight detection. An infrared light emitting unit emits infrared light to the eyeball of a user who is gazing at displayed image. The reflected light from the eyeball that is obtained when the infrared light is emitted is detected by an image capturing unit which includes a light receiving element, thereby obtaining a captured image of the eyeball. Image quality degradation is reduced by providing a reduction unit that reduces the light from the infrared light emitting unit to the display unit in a planar view.

The line of sight of the user to the displayed image is detected from the captured image of the eyeball obtained by the image capturing operation using the infrared light. A known method can be arbitrarily applied for the line-of-sight detection using the captured eyeball image. As an example, a line-of-sight detection method based on Purkinje images caused by the reflection of the emitted light on the cornea can be used.

More specifically, line-of-sight detection processing is performed based on a pupil-cornea reflection method. The line of sight of the user is detected by using the pupil-cornea reflection method to calculate a line-of-sight vector representing the direction (rotation angle) of the eyeball based on the image of the pupil and the Purkinje images included in the captured image of the eyeball.

The display device 50 (display system SYS) according to one embodiment of the present invention can include an image capturing device including a light receiving element, and control a displayed image on the display device 50 (display system SYS) based on the line-of-sight information of the user obtained from the image capturing apparatus.

More specifically, in the display device 50 (display system SYS), a first field-of-view region which is gazed by the user and a second field-of-view region other than the first field-of-view region are determined based on the line-of-sight information. The first field-of-view region and the second field-of-view region may be determined by a control device (for example, the control circuit 300) of the display device 50 (display system SYS). Alternatively, the first display region and the second display region may be determined by an external control device and the display device may receive information corresponding to this determination. Control can be performed in the display region of the display device 50 (display system SYS) so that the display resolution of the first field-of-view region will be higher than the display resolution of the second field-of-view region. That is, the resolution of the second field-of-view region may be lowered more than the resolution of the first field-of-view region.

In addition, the display region includes a first region and a second region different from the first region, and a region with a high degree of priority is determined from the first display region and the second display region of the display region based on the line-of-sight information. The first display region and the second display region may be determined by the control device of the display device 50. Alternatively, the first display region and the second display region may be determined by an external control device and the display device may receive information corresponding to this determination. Control may be performed so that the resolution of a region with the high degree of priority will be set higher than the resolution of a region other than the region with the high degree of priority. That is, the resolution of a region with a relatively low degree of priority can be set low.

Note that an AI can be used for the determination of the first field-of-view region and the region with the high degree of priority. The AI may be a model configured to estimate, from an image of the eyeball, the angle of the line of sight and the distance to an object as the target of the gaze by using the image of the eyeball and the direction actually gazed by the eyeball of the image as the training data. The display device, the image capturing device, or an external device may include the AI program. If the AI program is included in an external device, information determined by the AI program will be transmitted to the display device 50 (display system SYS) by communication.

In a case in which display control is to be performed based on visual recognition detection, the display device 50 (display system SYS) can be applied to a pair of smart glasses that further includes an image capturing device configured to capture the outside. The smart glasses can display the captured external information in real time.

According to the present invention, a technique advantageous in switching a display mode naturally in a display device can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-167219, filed Oct. 1, 2020, which is hereby incorporated by reference herein in its entirety.

What is claimed is:

1. A photoelectric conversion device comprising:
an optical unit that includes a plurality of lenses;
a shutter button;
an image capturing element configured to receive light that passed through the optical unit; and
a display unit configured to display an image captured by the image capturing element,
wherein the display unit includes a display device comprising: (1) a scanning circuit configured to scan a pixel array in which a plurality of pixels are arranged in a matrix; and (2) a control circuit configured to control the scanning circuit to scan the pixel array in accordance with a display mode selected among a plurality of display modes,
wherein the plurality of display modes includes a first display mode for repeatedly performing an operation formed by a plurality of scanning sequences,
wherein each of the plurality of scanning sequences scans the pixel array,
wherein the plurality of scanning sequences includes (1) a first scanning sequence by which the scanning circuit scans, in a predetermined order, predetermined scanning lines of the pixel array, and (2) a scanning sequence other than the first scanning sequence among the plurality of scanning sequences in the first display mode,
wherein, when shifting to the first display mode from a display mode that is other than the first display mode among the plurality of display modes, the control circuit controls the scanning circuit to finish scanning of the pixel array according to the display mode other than the first display mode and then to start the operation from the first scanning sequence and to repeatedly perform the plurality of scanning sequences sequentially in a predetermined order,
wherein in a case of the shutter button being half-pressed, shifting to the first display mode from a display mode which is other than the first display mode is performed, and
wherein a display rate of the first display mode is higher than a display rate of the display mode which is other than the first display mode.

2. The photoelectric conversion device according to claim 1, wherein the first scanning sequence is configured to scan, in the predetermined order, a predetermined pair of scanning lines of the pixel array, and
wherein the scanning sequence other than the first scanning sequence is configured to scan, in a predetermined order, a predetermined pair of scanning lines, of the pixel array, that is different from the predetermined pair of the scanning lines in the first scanning sequence.

3. The photoelectric conversion device according to claim 1, wherein an image with a resolution that is lower than a resolution generated by the plurality of scanning sequences is generated by the first scanning sequence.

4. The photoelectric conversion device according to claim 1, wherein the first scanning sequence is configured to scan the pixel array at interval, and the scanning sequence other than the first scanning sequence is configured to scan a scan line that is not scanned in the first scanning sequence.

5. The photoelectric conversion device according to claim 1, wherein in the first scanning sequence, the scanning circuit scans the scanning lines from an initial line in the pixel array to an end line in the pixel array, and
wherein in the scanning sequence other than the first scanning sequence, the scanning circuit scans the scanning lines from a line next to the initial line in the pixel array to an end line in the pixel array.

6. The photoelectric conversion device according to claim 1, further comprising an image processor configured to generate image display data for displaying an image on the pixel array,
wherein the device further comprises a synchronization controller configured to synchronize the display mode of the scanning circuit and the display mode of the image processor.

7. The photoelectric conversion device according to claim 6, wherein when shifting to the first display mode from a display mode that is other than the first display mode among the plurality of display modes, the display device is not set to an initial state.

8. The photoelectric conversion device according to claim 7, wherein when shifting to the first display mode from a display mode that is other than the first display mode among the plurality of display modes, the image processor is not set to an initial state.

9. The photoelectric conversion device according to claim 1, further comprising a counter configured to count a vertical synchronization signal,
wherein in the first display mode, based on a result obtained by the counter from counting the vertical synchronization signal, the control circuit controls, among the plurality of scanning sequences, a scanning sequence by which the scanning circuit scans the pixel array, and the counter starts counting from a reset state.

10. The photoelectric conversion device according to claim 9, wherein the counter is reset when shifting to the first display mode from the display mode other than the first display mode among the plurality of display modes.

11. The photoelectric conversion device according to claim 9, wherein the plurality of display modes further includes a second display mode for causing the scanning circuit to scan the pixel array by one scanning sequence, and the counter is in the reset state in the second display mode.

12. The photoelectric conversion device according to claim 9, wherein the plurality of scanning sequences are set as a first plurality of scanning sequences and the operation is set as a first operation,
wherein the plurality of display modes further includes a third display mode for causing the scanning circuit to repeatedly perform a second operation formed by a second plurality of scanning sequences including a second scanning sequence different from the first scanning sequence,
wherein, when shifting to the third display mode from a display mode other than the third display mode among the plurality of display modes, the control circuit controls the scanning circuit to start the second operation from the second scanning sequence, and the counter starts counting from the reset state in the third display mode.

13. The photoelectric conversion device according to claim 12, wherein the counter is reset when shifting to the third display mode from the display mode other than the third display mode among the plurality of display modes.

14. The photoelectric conversion device according to claim 1, wherein a display rate of the first scanning sequence is the same as a display rate of the scanning sequence other than the first scanning sequence among the plurality of scanning sequences in the first display mode.

15. The photoelectric conversion device according to claim 1, wherein the plurality of display modes further includes a second display mode for causing the scanning circuit to scan the pixel array by one scanning sequence.

16. The photoelectric conversion device according to claim 15, wherein a display rate of the first display mode is higher than a display rate of the second display mode.

17. The photoelectric conversion device according to claim 1, wherein the plurality of scanning sequences are set as a first plurality of scanning sequences and the operation is set as a first operation,
wherein the plurality of display modes further includes a third display mode for causing the scanning circuit to repeatedly perform a second operation formed by a second plurality of scanning sequences including a second scanning sequence different from the first scanning sequence, and
wherein, when shifting to the third display mode from a display mode other than the third display mode among the plurality of display modes, the control circuit controls the scanning circuit to start the second operation from the second scanning sequence.

18. The photoelectric conversion device according to claim 17, wherein a display rate of the third display mode is higher than a display rate of the first display mode.

19. The photoelectric conversion device according to claim 17, wherein the number of types of scanning sequences repeatedly performed in the third display mode is greater than the number of types of scanning sequences repeatedly performed in the first display mode.

20. The photoelectric conversion device according to claim 1, further comprising an image processor configured to generate image display data for displaying an image on the pixel array,
wherein the image processor is configured to generate image display data for displaying an image on the pixel array.

21. The photoelectric conversion device according to claim 20, wherein the image processor generates different image display data in accordance with each of the plurality of display modes.

22. The photoelectric conversion device according to claim 20, wherein when shifting to the first display mode, the image processor generates image data corresponding to the first scanning sequence.

23. A photoelectric conversion device comprising:
an optical unit that includes a plurality of lenses;
a shutter button;
an image capturing element configured to receive light that passed through the optical unit; and
a display unit configured to display an image captured by the image capturing element,
wherein the display unit includes a display device comprising: (1) a scanning circuit configured to scan a pixel array in which a plurality of pixels are arranged in a matrix; and (2) a control circuit configured to control the scanning circuit to scan the pixel array in accordance with a display mode selected among a plurality of display modes,
wherein the plurality of display modes includes a first display mode for repeatedly performing an operation formed by a plurality of scanning sequences,
wherein each of the plurality of scanning sequences scans the pixel array,
wherein the plurality of scanning sequences includes (1) a first scanning sequence and (2) a second scanning sequence,
wherein the first scanning sequence is configured to scan odd-numbered rows in the pixel array,
wherein the second scanning sequence is configured to scan even-numbered rows in the pixel array,
wherein, when shifting to the first display mode from a display mode which is other than the first display mode among the plurality of display modes, the control circuit controls the scanning circuit to finish scanning of the pixel array according to the display mode other than the first display mode and then to start the operation from the first scanning sequence and to repeatedly perform the plurality of scanning sequences sequentially in a predetermined order, wherein in a case of the shutter button being half-pressed, shifting to the first display mode from a display mode which is other than the first display mode is performed, and wherein a display rate of the first display mode is higher than a display rate of the display mode which is other than the first display mode.

24. The photoelectric conversion device according to claim 23, wherein in the first scanning sequence, the scanning circuit scans the scanning lines from an initial line in the pixel array to an end line in the pixel array, and wherein in the second scanning sequence, the scanning circuit scans the scanning lines from a line next to the initial line in the pixel array to an end line in the pixel array.

* * * * *